(12) United States Patent
Durie et al.

(10) Patent No.: US 8,505,092 B2
(45) Date of Patent: Aug. 6, 2013

(54) DYNAMIC PROVISIONING OF PROTECTION SOFTWARE IN A HOST INTRUSION PREVENTION SYSTEM

(75) Inventors: Anthony Robert Durie, Ottawa (CA); William G. McGee, Kanata (CA)

(73) Assignee: Trend Micro Incorporated, Tokyo (JP)

( * ) Notice: Subject to any disclaimer, the term of this patent is extended or adjusted under 35 U.S.C. 154(b) by 777 days.

(21) Appl. No.: 11/874,590

(22) Filed: Oct. 18, 2007

(65) Prior Publication Data

US 2008/0168560 A1 Jul. 10, 2008

Related U.S. Application Data

(60) Provisional application No. 60/883,657, filed on Jan. 5, 2007.

(51) Int. Cl.
*H04L 29/06* (2006.01)

(52) U.S. Cl.
USPC .......................................................... 726/22

(58) Field of Classification Search
None
See application file for complete search history.

(56) References Cited

U.S. PATENT DOCUMENTS

| | | | |
|---|---|---|---|
| 5,636,345 A | 6/1997 | Valdevit | |
| 5,944,782 A * | 8/1999 | Noble et al. | 709/202 |
| 6,751,659 B1 | 6/2004 | Fenger | |
| 6,917,946 B2 | 7/2005 | Corl | |
| 7,000,247 B2 * | 2/2006 | Banzhof | 726/2 |
| 7,035,828 B2 | 4/2006 | Ketonen | |
| 7,185,192 B1 | 2/2007 | Kahn | |
| 7,260,846 B2 | 8/2007 | Day | |
| 7,386,525 B2 | 6/2008 | Nurmela | |
| 7,389,539 B1 * | 6/2008 | Kouznetsov | 726/22 |
| 7,451,488 B2 | 11/2008 | Cooper | |
| 7,472,422 B1 * | 12/2008 | Agbabian | 726/25 |
| 7,480,941 B1 * | 1/2009 | Balasubramaniam et al. | 726/24 |
| 7,685,271 B1 | 3/2010 | Schneider | |
| 7,783,800 B2 | 8/2010 | Staats | |
| 8,051,483 B2 | 11/2011 | Fang et al. | |
| 8,056,135 B2 | 11/2011 | Fang et al. | |
| 2002/0107807 A1 * | 8/2002 | Ketonen et al. | 705/51 |
| 2005/0010821 A1 * | 1/2005 | Cooper et al. | 713/201 |
| 2005/0182950 A1 | 8/2005 | Son | |
| 2005/0235352 A1 | 10/2005 | Staats | |
| 2006/0101517 A1 | 5/2006 | Banzhof et al. | |
| 2006/0133267 A1 | 6/2006 | Alex | |
| 2006/0190997 A1 | 8/2006 | Mahajani | |
| 2007/0028304 A1 * | 2/2007 | Brennan | 726/24 |
| 2007/0143827 A1 * | 6/2007 | Nicodemus et al. | 726/2 |
| 2008/0168560 A1 * | 7/2008 | Durie et al. | 726/23 |
| 2008/0168561 A1 * | 7/2008 | Durie et al. | 726/23 |
| 2008/0189784 A1 | 8/2008 | Mangione-Smith | |
| 2008/0275985 A1 | 11/2008 | Kundu | |
| 2009/0106842 A1 * | 4/2009 | Durie | 726/25 |
| 2011/0179489 A1 | 7/2011 | Durie | |

\* cited by examiner

*Primary Examiner* — Michael R Vaughan

(74) *Attorney, Agent, or Firm* — IP-MEX Inc.; Victoria Donnelly

(57) ABSTRACT

Methods and apparatus for optimizing security configurations of a set of computers are disclosed. A set of local servers, each functioning as a deep-security manager supporting a respective subset of the computers, maintains protection software containing filters and rules for deploying each filter. A local server receives updated protection software from a central server. Each local server interrogates each computer of its subset of computers to acquire computer-characterizing data and applies relevant rules to determine an optimal set of filters for each computer. Each rule adaptively determines required characterizing data elements from each computer for determining an optimal security configuration. A local server updates the security configuration of a computer to suit changes in the operational environment of the computer.

15 Claims, 32 Drawing Sheets

FIG. 21

Table 2301:

| Rule Identifier | Number of queries | List of query identifiers |
|---|---|---|
| 0 | 2 | 2 5 |
| 1 | 3 | 0 3 8 |
| 2 | 3 | 1 3 6 |
| 3 | 2 | 4 8 |
| 4 | 2 | 2 3 |
| 5 | 2 | 1 2 |
| 6 | 2 | 1 5 |
| 7 | 4 | 0 4 7 8 |

Table 2302:

| Query identifier | Number of rules | List of rule identifiers |
|---|---|---|
| 0 | 2 | 1 7 |
| 1 | 3 | 2 5 6 |
| 2 | 3 | 0 4 5 |
| 3 | 3 | 1 2 4 |
| 4 | 2 | 3 7 |
| 5 | 2 | 0 6 |
| 6 | 1 | 2 |
| 7 | 1 | 7 |
| 8 | 3 | 1 3 7 |

FIG. 23

| Query identifier | Time processed | Agent Response |
|---|---|---|
| 0 | | |
| 1 | | |
| 2 | | |
| 3 | | |
| 4 | | |
| 5 | | |
| 6 | | |
| 7 | | |
| 8 | | |

FIG. 24

DYNAMIC PROVISIONING OF PROTECTION SOFTWARE IN A HOST INTRUSION PREVENTION SYSTEM

CROSS-REFERENCE TO RELATED APPLICATIONS

This application claims priority to provisional application Ser. No. 60/883,657 to Durie et al., entitled "Dynamic Removal of Filters in a Host Intrusion Prevention System" filed on Jan. 05, 2007, which is incorporated herein by reference.

FIELD OF THE INVENTION

The present invention relates to intrusion prevention and detection systems. In particular, the invention is directed to optimal configuration of a host security system with dynamic addition and removal of filters in a plurality of hosts subscribing to a host intrusion-prevention system. The invention is also directed to communication optimization between a deep security manager (DSM) and the hosts.

BACKGROUND

An intrusion detection system (IDS) is a system devised to detect many types of malicious network traffic that can't be detected by a conventional firewall. This includes network attacks against vulnerable services, data driven attacks on applications, unauthorized logins, access to sensitive files, viruses, Trojan horses, and worms.

An IDS comprises sensors which generate security events and a central Engine that records events logged by the sensors in a database and uses a system of rules to generate alerts from security events received. In a host-based system, the sensor usually consists of a software agent, which monitors activity of the host on which it is installed and identifies intrusions.

An intrusion prevention system (IPS) responds to a suspicious activity by resetting a connection or by reprogramming a firewall to block network traffic from the suspected malicious source either automatically or in response to a command of an operator. This is traditionally achieved by examining network communications and identifying patterns (known as signatures) of common computer attacks using a process known as "deep packet inspection" (DPI). DPI is a process of packet filtering where the data content of a packet, not just the packet's header, is examined to determine if the packet meets predefined criteria. An examined packet may be modified, discarded, redirected, or marked. A DPI device may also identify data flows.

A host intrusion prevention system (HIPS) prevents malicious behavior from occurring on a host (server or desktop computer). Unlike Network intrusion prevention system (NIPS), HIPS uses software-based filters, and the filters are deployed on the host itself, closest to the applications and data to be protected. Each filter, when added to the HIPS, incrementally adds to the load of the system as a whole, resulting in slowing down the operation of the system.

Accordingly, there is a need in the industry for developing a method for optimally provisioning filters to each host supported by HIPS and determining whether a filter can be removed from a host security configuration. There is also a need for minimizing the resulting processing effort while ensuring appropriate filter provisioning.

SUMMARY

It is an object of the invention to provide a method for dynamically providing protection-software to a host in a host-intrusion-prevention system (HIPS).

It is another object of the invention to provide a method for dynamically removing redundant protection-software components from the HIPS.

It is a further object of the invention to provide a method of minimizing processing effort in the HIPS while ensuring appropriate provisioning of protection software.

The main components of host-intrusion-protection system according to the present invention include a central server maintaining protection software, a plurality of local servers, each functioning as a deep security manager (DSM) receiving protection-software from the central server and supporting a respective plurality of hosts, and software agents (hereinafter referenced as agents for brevity) residing in each host.

The protection software comprises filters and detection rules (hereinafter referenced as "rules" for brevity) for matching each filter to a host based on known intrusion patterns, host operational configuration, and host state. The rules rely on "detection expressions" (hereinafter referenced as expressions) which contain scripts that can process information gathered from a host. Based on host operational configuration and events, filters that become redundant are dynamically removed from a host's security configuration to improve performance of the HIPS engine.

A recommendation engine associated with each DSM uses a set of detection rules and associated detection expressions to determine host configuration elements which match specific host attributes. The host-configuration elements include intrusion-prevention filters. The DSM sends queries to hosts to obtain the information relevant to each filter. The DSM also maintains a profile of each subtending host. An agent provided at each host processes received queries and sends relevant information to a respective recommendation engine.

The recommendation engine processes query responses related to host configuration and events, and may modify a host's security configuration accordingly. The recommendation engine may recommend modifying the host's security configuration by adding new filters to a host and/or removal of current filters from the host.

The host-intrusion-protection system according to the present invention is characterized by: using specific and reusable scripts for a centralized scripting engine, the scripts having the capability of retrieving configuration and event information from any host in the system; deriving a set of host queries dynamically from the scripts; dynamically determining required filters for each host; and determining if a filter may be removed from the host's security configuration.

Thus, by using a dynamic, deterministic, and intelligent mechanism for protection-software provisioning and determining when a filter may be removed from a host, the performance of the host is improved.

In accordance with an aspect, the present invention provides an intrusion-protection system for protecting a plurality of hosts. The system comprises: a plurality of agents each associated with one of the hosts; a plurality of local servers each local server communicatively coupled to each host in a respective subset of the plurality of hosts; and a central server maintaining a software library comprising a plurality of encoded filters and a plurality of encoded rules. The central server shares the software library with the each local server. Each local server communicates with an agent, from among the plurality of agents, associated with each host to acquire metadata of each host and prescribes a subset of filters for each host according to the metadata. The metadata comprises a plurality of data elements characterizing configuration of each host and processes executed within each host.

The software library further comprises a set of rules and a set of queries, where each query corresponds to a specific data element from among the plurality of data elements. A rule may require host metadata, in which case execution of the rule comprises processing at least one query. A data element acquired from processing a query from among the at least one query determines either a requirement for a subsequent data element to execute a specific rule or acquisition of all data elements needed to execute the specific rule and determine a corresponding action.

Execution of a rule in the plurality of rules determines at least one of: selection of a filter from among the plurality of filters for installation in an examined host from among the plurality of hosts; selection of a filter already installed in the examined host for removal from the examined host; and ascertaining that filters already installed in the examined host provide adequate intrusion protection to the examined host.

Preferably, each local server maintains a database storing, for each host and for every query processed, a record of every query, a record of a response acquired from each host, an indication of a last execution time, and an indication of a recommended succeeding execution time. Preferably, each local server maintains historical data related to changes in queries responses.

In accordance with another aspect, the present invention provides a method of intrusion prevention implemented at a server supporting a plurality of hosts. The method comprises steps of: maintaining a set of filters, each filter being a set of instructions; prompting a target host, from among the plurality of hosts, to provide metadata characterizing the target host, where the metadata includes a plurality of data elements; receiving the metadata from the target host; determining a subset of rules, from among a predefined set of rules according to the metadata; executing the subset of rules to determine applicable filters from among the set filters; and transmitting the applicable filters to the target host.

The method comprises further steps of: repeating the prompting step; receiving updated metadata from the target host; and comparing new metadata to previous metadata. Metadata discrepancy determined from the step of comparing invokes a further step of executing a new set of rules to either ascertain adequacy of already installed filters in the target host or recommend changes. The changes may include installing new filters in the target host and/or removal of already installed filters from the target host.

With the metadata comprising a plurality of data elements, the method further comprises maintaining for the target host: a record of a time of receiving each data element of the metadata; content of each data element; identifiers of the subset of rules; and identifiers of the applicable filters.

In a preferred embodiment, the method comprises steps of: associating each rule in the predefined set of rules with a respective data element from among the plurality of data elements; selecting the respective data element as a current data element; and executing each rule using the current data element to determine either a result of executing each rule or designating a subsequent data element as a current data element and continuing the step of executing the each rule. The result of executing the each rule may comprise either retaining a current security configuration of the target host or updating the current security configuration of the target host. Updating the security configuration may comprise steps of installing at least one new filter in the target host or removing at least one already installed filter from the target host.

The method further comprises steps of receiving new rules from a central server and placing the new rule in a list of obligatory rules that are executed for a host regardless of the state of the host.

In accordance with a further aspect, the present invention provides an intrusion-protection method for protecting a plurality of hosts. The method comprises steps of: identification of intrusion patterns; devising a set of data filters, each data filter corresponding to at least one of the intrusion patterns; formulating a set of descriptors for characterizing the plurality of hosts; determining a set of rules, each rule associated with a respective data filter in the set of filters and with a subset of descriptors from among the set of descriptors; executing, for a selected host, a selected rule from among the set of rules using content of a respective subset of descriptors; and ascertaining relevance of a specific data filter associated with the selected rule to the selected host according to a result of executing the selected rule.

The method comprises a further step of either installing the specific data filter or removing the specific data filter from the selected host. The method preferably associates each rule with a respective subset of hosts based on static host characteristics.

In accordance with a further aspect, the present invention provides an intrusion-prevention server comprising: an interface communicatively coupled to a plurality of hosts; a plurality of data filters, each data filter corresponding to at least one of intrusion patterns from among a set of intrusion patterns; a plurality of encoded descriptors for characterizing the plurality of hosts; a plurality of encoded rules each rule associated with a subset of descriptors from among the plurality of encoded descriptors; and a recommendation engine for applying a subset of the encoded rules to a selected host from among the plurality of hosts to recommend a subset of the data filters for inclusion in the selected host.

The intrusion-prevention server further comprises an interface communicatively coupled to a central server for receiving the data filters, the encoded descriptors, and the encoded rules. The intrusion-prevention server further comprises a database maintaining a profile of each host in the plurality of hosts.

In accordance with a further aspect, the present invention provides an intrusion-prevention server supporting a plurality of hosts $H_k$, $0 \leq k < \nu$, where $\nu$ is an integer greater than 0. The server comprises: a first data store holding a set of $\mu$ encoded filters $\{F_m, 0 \leq m < \mu\}$; a second data store holding a global set D of Q descriptors $\{d_j, 0 \leq j < Q\}$; an interface with the plurality of hosts for acquiring metadata $C_k$ for characterizing a selected host $H_k$, the metadata $C_k$ comprising data elements having a one-to-one correspondence to descriptors in a domain of descriptors of the global set D; and an engine for executing a set of rules $\{\Gamma_m(C_k), 0 \leq m < \mu\}$ to determine a binary indicator $\Phi_{m,k}$ where a value of $\Phi_{m,k}$ equal to 1 assigns filter $F_m$ to host $H_k$ and a value of $\Phi_{m,k}$ equal to 0 excludes filter $F_m$ from host $H_k$. If $\Phi_{m,k}=1$ and filter $F_m$ is already installed in host $H_k$, then nothing need be done. If $\Phi_{m,k}=1$ and filter $F_m$ is not installed in host $H_k$, then the server sends filter $F_m$ to host $H_k$. If $\Phi_{m,k}=0$ and filter $F_m$ is already installed in host $H_k$, then filter $F_m$ is removed from host $H_k$. If $\Phi_{m,k}=0$ and filter $F_m$ is not installed in host $H_k$, then nothing need be done.

A third data store holds chronological metadata of the selected host $H_k$. A program store holds instructions for determining the domain of descriptors using the chronological metadata.

The engine selects a subset of descriptors from within the domain of descriptors according to a current state of the selected host and determines the binary indicator based solely on the subset of descriptors. Each rule $\Gamma_m(C_k)$ may be associated with a tree of descriptors, in which case the subset of descriptors are descriptors along a tree path between a root descriptor and a leaf descriptor of the tree of descriptors.

In accordance with a further aspect, the present invention provides a method, implemented at a server supporting a plurality of hosts, for providing intrusion-protection software to the hosts. The method comprises steps of: devising a superset of rules for selectively assigning intrusion-protection software to the hosts; formulating a superset of descriptors for characterizing the hosts; selecting a target host from among the plurality of hosts; acquiring from the target host, a first set of data elements defining a first rule path for a first rule; executing the first rule according to the first set of data elements; acquiring from the target host, a second set of data elements defining a part of a second rule path for a second rule where the second rule path intersects the first rule path in at least one common descriptor; and executing the second rule according to the second set of data elements and a subset of the first set of data elements corresponding to the at least one common descriptor.

Rather than using the entire superset of rules for each host, a host-specific set of rules determined from among the superset of rules and comprising rules applicable to each host individually may be defined to reduce the processing effort. Accordingly, the first rule and the second rule belong to a set of rules specific to the target host.

Data elements acquired from the target host for an individual rule are shared among all rules applicable to the target host. Thus, the total acquired data elements correspond to a union of descriptors defining the rule paths of the individual rules.

A domain of descriptors is defined for each rule. A domain comprises descriptors from the superset of descriptors relevant to each rule. Thus, the first rule path belongs to a domain of the first rule and the second rule path belongs to a domain of the second rule. The domain of descriptors of each rule may be arranged in a tree structure having a root descriptor, inner descriptors, and leaf descriptors. Accordingly, the method comprises steps of: setting a current descriptor to equal the root descriptor; starting a rule path of each rule for the target host from the root descriptor; and repetitively determining a subsequent descriptor along the rule path according to a data element of the target host corresponding to the current descriptor until a leaf descriptor is encountered. When the subsequent descriptor is an inner descriptor, the subsequent descriptor becomes the current descriptor. A rule uses a rule path from the root descriptor to the leaf descriptor to determine if a data filter corresponding to the rule is needed for the target host.

In accordance with another aspect, the present invention provides a method for providing protection software to a plurality of hosts. The method comprises steps of: determining a current time indicator; sending, from a server, a set of queries to a target host from among the plurality of hosts to acquire current characterizing data elements from the target host; and comparing the current characterizing data elements with prior characterizing data elements of the target host. A current protection-software configuration is determined for the target host if at least one current characterizing data element differs from a corresponding prior characterizing data element.

If the current protection-software configuration, just determined, differs from a prior protection-software configuration, a host-reconfiguration time indicator is set to equal the current time indicator, and the current protection-software configuration is transmitted to the target host. The current characterizing data elements are retained for subsequent use as prior characterizing data elements, and the current protection-software configuration is retained for subsequent use as prior protection-software configuration.

Each host is associated with a host type, from among a predefined set of host types, and a set of descriptors, from among a predefined superset of descriptors, is associated with each host type. Thus, the set of queries sent to the target host is associated with a specific set of descriptors associated with a type of the target host.

A superset of rules, where each rule corresponds to an element of the protection-software, is predefined. To determine the current protection-software configuration, selected rules from among the superset of rules are executed according to the current characterizing data elements.

The queries in the set of queries may be assigned different activation intervals. Accordingly, the method comprises further steps of: associating an activation interval with each query in the set of queries; identifying particular queries in the set of queries where, for each of the particular queries, a sum of a respective activation interval and a prior time indicator associated with the target host exceeds the current time indicator; removing the particular queries from the set of queries; and retaining the current time indicator for subsequent use as a prior time indicator associated with the target host.

Host-specific monitoring periods may be dynamically updated to reflect changing host operational conditions. Accordingly, the method comprises further steps of: determining a current host-reconfiguration period as the current time indicator minus a prior host-reconfiguration time indicator; determining a current monitoring period for the target host as an arithmetic mean of the current host-reconfiguration period and a prior monitoring period; and retaining the monitoring period for subsequent use as a prior monitoring period.

In accordance with a further aspect, the present invention provides a recommendation engine associated with a server for providing intrusion protection to a plurality of hosts communicatively connected to the server. The recommendation engine comprises: means for associating a monitoring period with each host from among the plurality of hosts; intrusion-protection software for determining a current host-protection configuration for each host; means for installing the current host-protection configuration in the target host upon determining discrepancy between the current host-protection configuration and a prior host-protection configuration of each host; means for recording successive host-reconfiguration periods where a host reconfiguration period is a difference between successive instants of time at each of which a current host-protection configuration differs from a prior host-protection configuration; means for updating the monitoring period according to a value of at least one of the successive host-reconfiguration periods for each host; and a scheduler for activating the intrusion-protection software according to the monitoring period.

The intrusion-protection software comprises: a set of queries for acquiring data elements from each host; and a set of rules which execute expressions for determining the current host-protection configuration based on the data elements.

In accordance with an embodiment, the means for updating the monitoring period updates the monitoring period associated with each host as an arithmetic mean value of a current host-reconfiguration period in the successive host-reconfiguration periods and a preceding monitoring period of each host.

In accordance with another embodiment, the means for updating the monitoring period updates the monitoring period associated with each host as an arithmetic mean value of a predetermined number of host-reconfiguration periods in the successive host-reconfiguration periods. The monitoring period associated with each host may also be updated to equal the arithmetic mean value minus a standard deviation of the predetermined number of host-reconfiguration periods subject to a condition that the monitoring period exceeds a predefine lower bound.

In accordance with a further aspect, the present invention provides a method of regulating communications between a server and a plurality of hosts. The server provides intrusion-protection software to the plurality of hosts. The method comprises: associating a monitoring time $\tau^*$ with a target host from among the plurality of hosts; and executing a process at the server for determining a current host-protection configuration for the target host. Where the current host-protection configuration differs from a prior host-protection configuration, the method comprises: installing the current host-protection configuration in the target host; recording a reconfiguration time as a current time indicator; determining a current reconfiguration period $\tau$ as a difference between a current reconfiguration-time indicator and a prior reconfiguration-time indicator; updating the monitoring period $\tau^*$ as $\tau^* \leftarrow (\tau^*+\tau)/2$ and; scheduling a subsequent execution of the process according to the monitoring period.

The monitoring period $\tau^*$ is subject to a constraint $\tau^* \leq \tau_b^*$, where $\tau_b^*$ is an upper bound specific to the target host.

The process for determining the current host-protection configuration comprises a step of executing a set of rules to determine the current host-protection configuration, where executing each rule comprises steps of: selecting a set of queries from a superset of queries according to a current state of the target host; sending the set of queries to the target host; and receiving from the target host a data element in response to each query in the set of queries.

The step of selecting the set of queries comprises for each query, starting with a root query, determining a subsequent query according to a data element received from the target host in response to each query, where a null subsequent query completes formation of the set of queries.

Each host in the plurality of hosts is selected as the target host at least once during a cyclic global monitoring period.

In accordance with a further aspect, the present invention provides a method of regulating communications between a server and a plurality of hosts. The server provides intrusion-protection software to the plurality of hosts. The method comprises: initializing to zero each of a first sum $\Sigma_1$, a second sum $\Sigma_2$, entry m of a vector $V_m$, $0 \leq m < \kappa$, and entry m a vector $W_m$, $0 \leq m < \kappa$, where $\kappa > 1$ is a predefined parameter; initializing a cyclic event counter j to −1; and executing a process for determining a current host-protection configuration for the target host.

Where the current host-protection configuration differs from a prior host-protection configuration, the method comprises: installing the current host-protection configuration in the target host; recording an event time as a current time indicator; for $j \geq 0$, determining a current reconfiguration period $\tau$ as a difference between a current reconfiguration-time indicator and a prior reconfiguration-time indicator; performing the operations $j \leftarrow (j+1)_{modulo\ \kappa}$, $\Sigma_1 \leftarrow \Sigma_1 + (\tau - V_j)$, $\Sigma_2 \leftarrow \Sigma_2 + (\tau^2 - W_j)$, $V_j \leftarrow \tau$, and $W_j \leftarrow \tau^2$; and updating the monitoring period according to $\Sigma_1$ and $\Sigma_2$; and for $j < 0$, setting the event counter j to zero. A subsequent execution of the process is scheduled according to the monitoring period.

In accordance with an embodiment, updating the monitoring period comprises further steps of: determining a mean reconfiguration period $<\tau>$ as $\Sigma_1/\kappa$; determining a reconfiguration-period standard deviation as $\sigma = (\Sigma_2/\kappa - <\tau>^2)^{1/2}$; and setting the monitoring period as $\tau^* = <\tau> - \alpha \times \sigma$, $\alpha$ being a predetermined design parameter. The monitoring period is constrained to remain between a lower bound $\tau_a^*$ and an upper bound $\tau_b^*$, so that $\tau_a^* \leq \tau^* \leq \tau_b^*$. The lower bound and the upper bound are specific to the target host.

The method comprises a further step of determining a global monitoring period during which each host in the plurality of hosts is selected at least once as the target host.

BRIEF DESCRIPTION OF THE DRAWINGS

Embodiments of the present invention will be further described with reference to the accompanying exemplary drawings, in which:

FIG. 21 illustrates data arrays used to facilitate reducing rule-processing effort in accordance with an embodiment of the present invention;

FIG. 23 illustrates dynamic mapping of rules to queries, and vice versa;

FIG. 24 illustrates a data structure for recording most-recent host metadata at a DSM for use in subsequent processing of rules, in accordance with an embodiment of the present invention;

DETAILED DESCRIPTION

Figure 1:
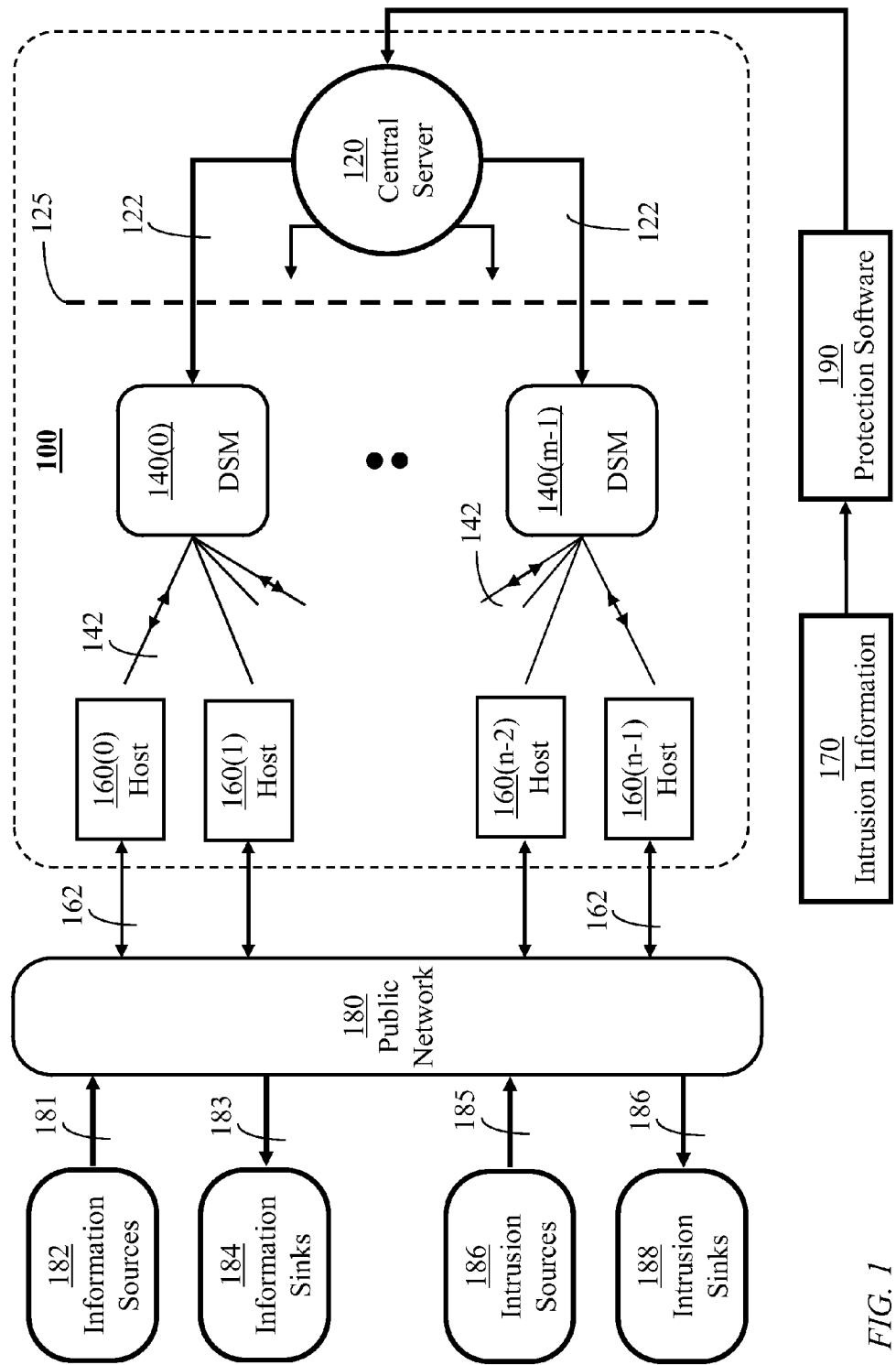
FIG. 1 illustrates a plurality of computers interconnected through a shared network and subjected to intrusion from intrusion sources connecting to the shared network, the computers further connecting to an intrusion-protection system comprising a plurality of local servers coupled to a central server which maintains a protection-software library, in accordance with an embodiment of the present invention.

The terms used in the specification are listed below.

Terminology

Host: A computing device, such as a personal computer or a server, connecting to a communications network is conventionally referenced as a "host".

Agent: An agent comprises selected software modules, including data filters (also called "filters") and rules, installed in a host for monitoring host activities and identifying intrusions. An agent also comprises firewall modules and deep-packet-inspection modules.

Intrusion-detection system (IDS): An IDS is a system that detects suspicious activity in a computer.

Intrusion-prevention system (IPS): An IPS is a system that responds to suspicious activity in a computer.

Host intrusion-prevention system (HIPS): A host intrusion prevention system (HIPS) protects hosts, such as server or personal computers from malicious intrusions.

Local server: In the context of the present invention, a local server is a computer configured to provide intrusion-protection software to a respective set of hosts.

Deep packet inspection (DPI): DPI is a process of packet filtering where the data content of a packet, not just the packet's header, is examined to determine if the packet contains undesirable data.

Deep-Security Manager (DSM): A local server providing deep-packet inspection software to subtending hosts is referenced as a deep-security manager.

Central server: A central server in the security system of the present invention stores and updates protection software and distributes the protection software to a plurality of local servers, functioning as deep-security managers (DSMs), which—in turn—selectively disseminate host-specific protection software.

Host operational configuration: The term refers to configuration of software used for normal operation of a host. This includes an operating system as well as application programs.

Host security configuration: The term refers to configuration of protection software provided to a host by a local server functioning as a security manager.

Host descriptor: A host descriptor is an encoded descriptor defined in a DSM to characterize one aspect of a host. For brevity, a host descriptor is hereinafter referenced as a descriptor. A host may be characterized by numerous descriptors. A host descriptor is a generic designation (such as 'IP address') applicable to any host from among a plurality of hosts.

Data element: A data element is the content of a descriptor in a specific host. For example, the data element "127.000.000.001" may be associated with the descriptor "IP address" of a first host and the data element "127.000.000.063" may be associated with the descriptor "IP address" of a second host. A data element may provide static information, quasi-static information or dynamic information. Static, or quasi-static, information may comprise the host's processor type, IP-address, storage capacity, etc. Dynamic information may comprise current application software, processes being run, errors logged, etc. Changes in the configuration of a host and/or the host's processing activities are reflected in the data elements communicated by the host. The terms "acquiring a descriptor" and "acquiring a data element corresponding to a descriptor" may be used synonymously.

Host descriptors are defined at a central server and distributed to local servers (DSMs). Data elements are acquired from each host through an agent residing in the host.

Metadata: The term "metadata" is generally used in the art to refer to concise data that characterize the content of monitored data in a data-transport medium or data-storage medium. In the context of a computer-communication system, the monitored data may be the content of computer files. Metadata about an individual data block might typically include the name of a field containing the data block and its length. Metadata about a computer file might typically include the name of the file, the type of file, and the name of the data administrator. In the context of the present application, metadata related to a specific host may comprise data elements characterizing the host.

Rule: A rule (also called a detection rule) is an encoded set of functions each function associated with a descriptor to determine a course of action for a target host, such as specifying a filter or a number of filters. In general, a rule may apply to each host in a plurality of hosts. However, based on static descriptors of a host, a DSM may determine a priori that a given rule is not applicable to the host. A function of a specific rule applied to a data element of a specific host results in either a pointer to another function within the set of functions defining the rule or in determining completion of the execution of the specific rule for the specific host.

Domain of a rule: The domain of a rule is a set of all descriptors that may be needed by the rule. The domain of a rule is conveniently represented as a tree with a starting descriptor as a root of the tree.

Rule path: A sequence of descriptors within a domain of a rule starting with a root descriptor and ending with a leaf in the tree representation of the rule is a rule path. A rule path always starts at the root descriptor but may end in any of the leaves depending on the time-varying data elements of a host.

Host-specific rule: A rule may be tailored to a specific host or a specific host type by eliminating descriptors within the domain of the rule that are known a priori to be inapplicable to the specific host or specific host type.

Query: Descriptors are a property of a DSM while data elements are a property of a host. A data element associated with a descriptor directs a rule path to a subsequent descriptor. A DSM acquires a data element corresponding to a descriptor by sending a query to an agent residing at the host. A root query corresponds to a root descriptor.

Intersecting rules: Two rules are said to be intersecting if there is at least one descriptor which is common in the domains of the two rules.

Protection software: In the context of the present invention, the term protection software refers to data filters for handling different patterns of intrusion, and rules for specifying relevant filters to a host based on metadata acquired from the host.

Expression: A rule executes functional expressions (also called "detection expressions" or "expressions") for data-elements' acquisition and processing. An expression may be invoked by more than one rule.

Host state: The term refers to current operational-software installed in a host as well as current processes executed by the host, host registry in a window operating system, open "listen-ports", and files in a normal filing system.

Host monitoring: Host monitoring is a process of acquiring a current state of a host for determining an appropriate security configuration of the host.

Host reconfiguration time indicator: A host-reconfiguration time indicator is an indicator of an instant of time at which a security configuration of a host changes.

Host reconfiguration period: A host reconfiguration period is a time interval between successive changes of a security configuration of a host.

Host monitoring period: A host monitoring period is a recommended waiting time between successive executions of a monitoring process for a specific host.

Global monitoring period: A global monitoring period is a period of time, specific to a DSM, during which each host supported by the DSM is monitored at least once. The host monitoring period may vary significantly from one host to another and a host may be monitored several times during a global monitoring period of the DSM to which the host belongs.

Intrusion-Protection System

An intrusion-protection system 100 for protecting a plurality of computer devices 160 is illustrated in FIG. 1. The computer devices are herein referenced as hosts 160 and individually identified as 160($j$), j=0, 1, . . . , n−1. The hosts 160 are interconnected through a public network 180, such as the Internet, through bidirectional links 162. The public network 180 also supports shared information sources 182 for selectively distributing information to the hosts 160, and information sinks 184 for receiving requests from the hosts 160. The public network 180 may be accessible by intrusion sources 186 sending unwanted software to the hosts 160 and intrusion sinks 188 receiving information collected from hosts 160.

The intrusion-protection system 100 comprises a central server 120 which maintains encoded intrusion-protection filters and detection rules devised for host-specific provisioning of intrusion-protection filters. The detection rules use detection expressions and each rule bases its filter selection on a set of data elements characterizing each host. The central server 120 securely communicates with a plurality of local servers 140 through links 122 to a private or public network 125. Each local server 140 supports a number of hosts 160. In the context of an Intrusion-Prevention System, the local server 140 may perform a function of a Deep Security Manager (DSM).

Intrusion information acquired by some intrusion-information means 170 is analyzed to identify intrusion patterns. Protection software 190 is devised, based on acquired intrusion patterns, for installation in the hosts. The protection software preferably comprises filters individually matching intrusion patterns. Given the variety of host hardware and software configurations, a large number of filters may be needed. The filters are maintained in the central server 120 to be distributed to individual local servers 140. A local server 140 may support a large number of hosts 160 in an enterprise and the host configurations may vary from one enterprise to another. A local server 140 may, therefore, need only a subset of the centrally maintained filters at the central server 120. The hosts 160 supported by a local server (DSM) 140 may have widely varying protection requirements and, therefore, each host may need only be provided with selected filters from among the filters supported by the local server.

Figure 2:
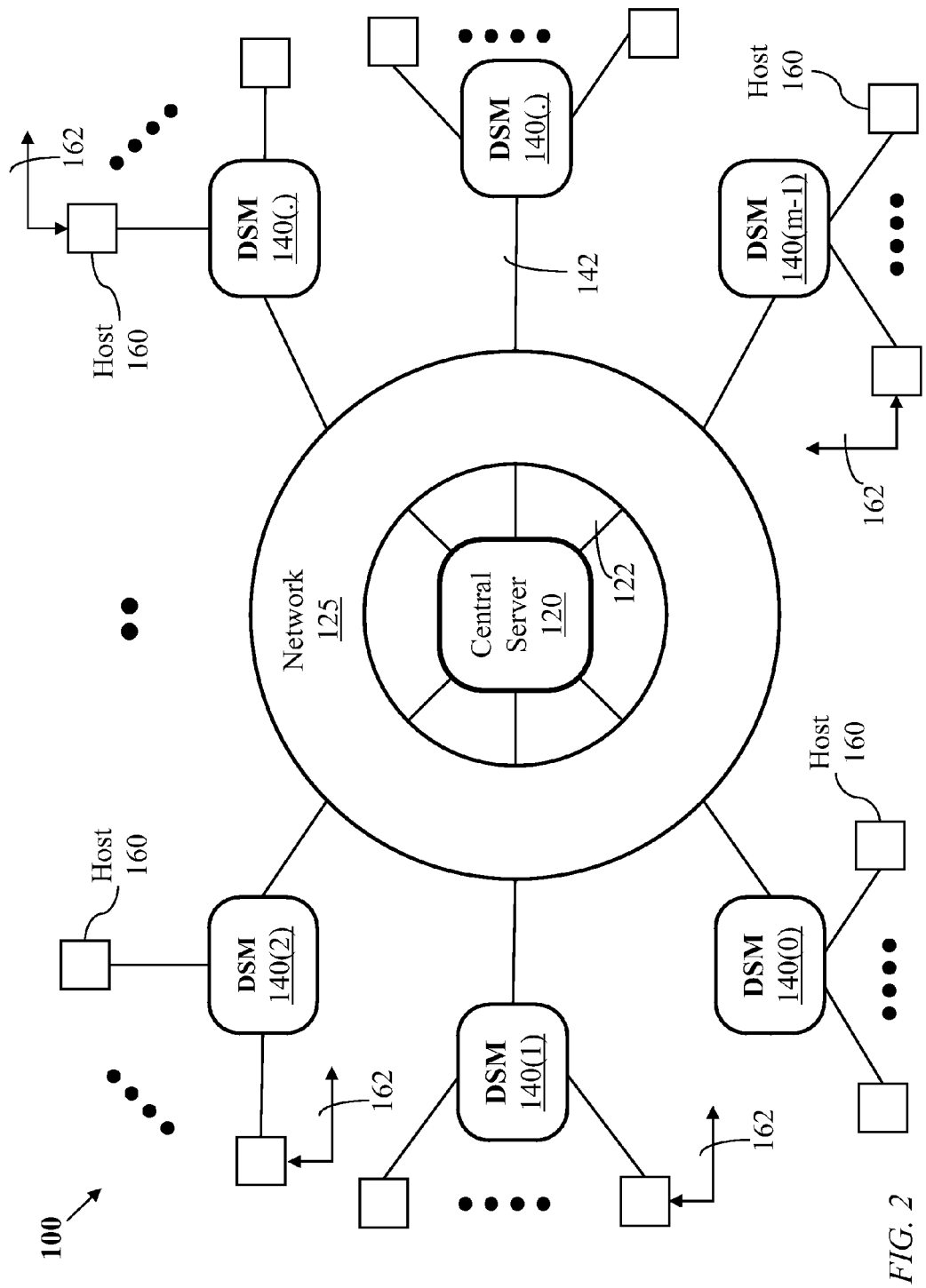
FIG. 2 further illustrates the intrusion-protection system of FIG. 1 where the central server distributes protection software to the plurality of local servers, each local server functioning as a deep-security manager (DSM), through a network and each local server selectively distributes protection software to a respective subset of computers, in accordance with an embodiment of the present invention.

FIG. 2 further illustrates the host intrusion-prevention system 100. The system 100 comprises a central server 120 which maintains encoded intrusion-protection filters, and encoded rules for matching filters to hosts 160. The central server 120 securely communicates with a plurality of local servers 140 through a private or public network 125. Each local server 140 supports a number of computer devices 160, synonymously referenced as hosts 160. A host 160 may connect to the public network through a bidirectional link 162.

The central server 120 may distribute protection software to individual local servers sequentially, in parallel, or in a combined sequential-parallel order. The central server 120 may comprise multiple servers arranged in a cooperative server farm. For the purpose of the present invention, the internal structure of central server 120 is irrelevant.

A local server 140 may evaluate the security-software configurations for subtending hosts 160 in sequential sessions and the tasks of rule processing are scheduled to maximize throughput. A local server 140 may have multiple processors.

The local server of interest functions as a deep-security manager (DSM). However, the methods of the present invention are also applicable to software distribution systems other than security-oriented systems.

Figure 3:
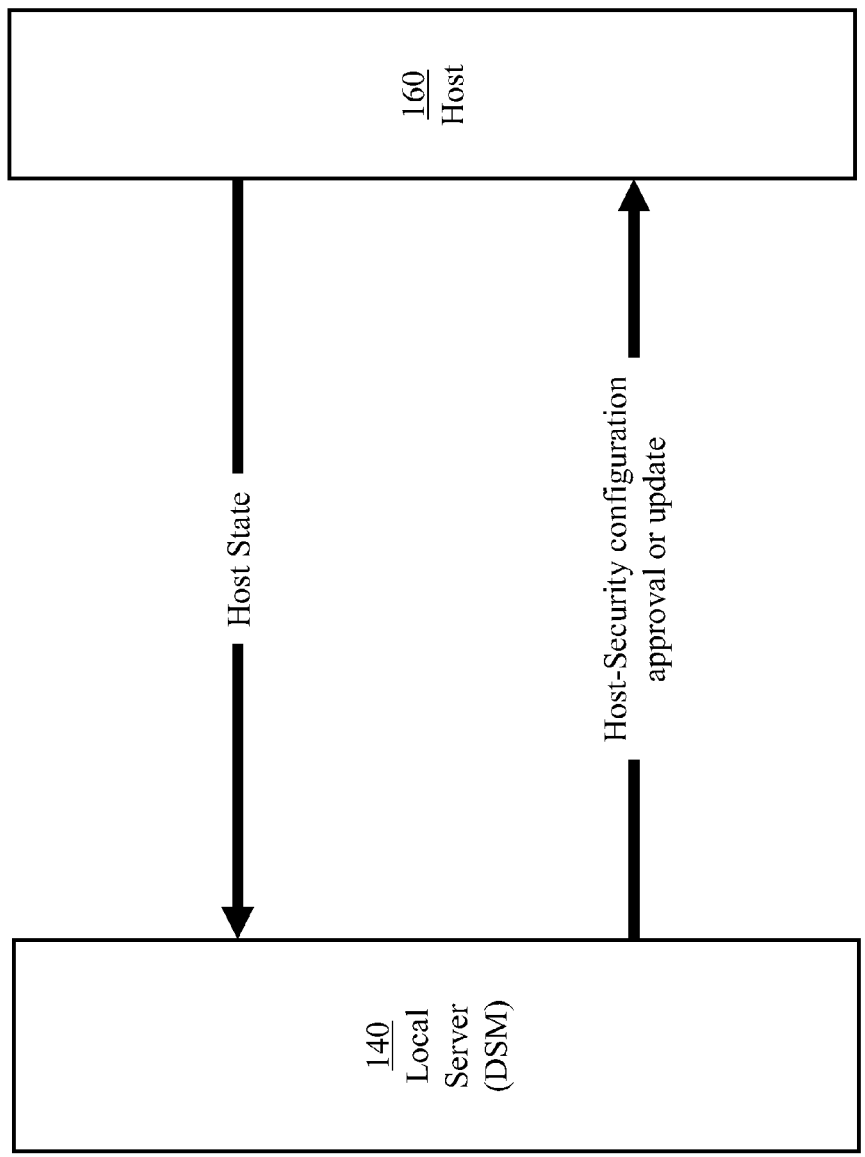
FIG. 3 illustrates communications between a DSM and a host.

FIG. 3 presents an overview of DSM-host communications. A host 160 provides data elements characterizing the state of the host to the DSM 140 and the DSM responds by either determining that a current security configuration at the host 160 need not change, or by providing a new security configuration to replace the current security configuration at the host. The new security configuration may be new filters, updated filters, or overall replacement of all current filters. The data elements provided by the host may be based on a state-dependent sequence of queries initiated by the local server 140 as will be described with reference to FIG. 11.

Figure 4:
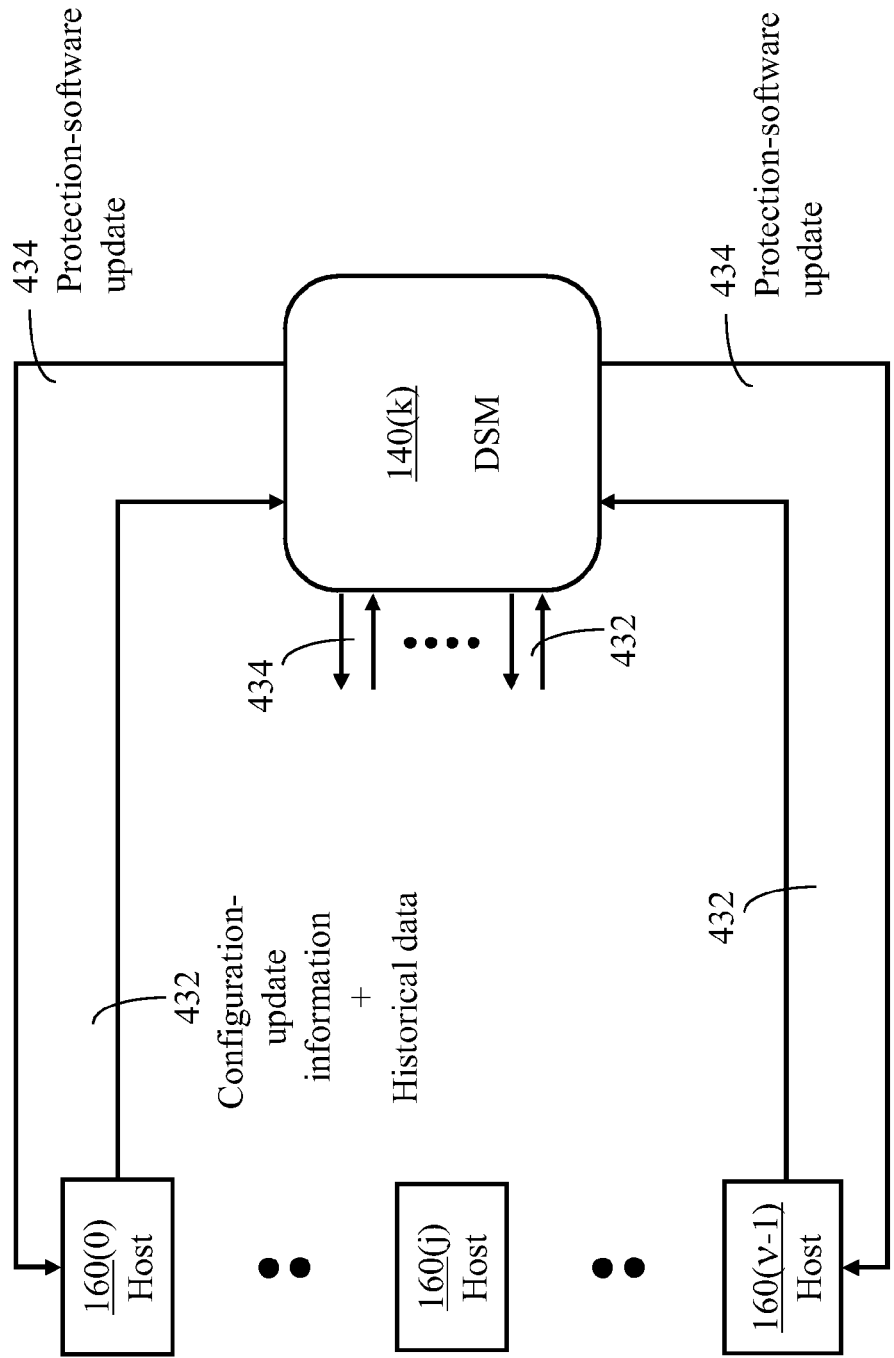
FIG. 4 illustrates a first scheme, in accordance with an embodiment of the present invention, of selective distribution of protection software from a DSM to a respective subset of hosts where each host communicates characterizing data to the DSM and the DSM responds by specifying protection software for each host.

FIG. 4 illustrates a first scheme, in accordance with an embodiment of the present invention, of selective distribution of protection software from a local server 140 (synonymously DSM 140) to a respective subset of hosts 160 where each host 160 communicates characterizing data to the local server 140 through a link 432 and the local server 140 responds by updating protection software allocated to the each host through a link 434. A security agent installed in host 160 may initiate filter-update process upon detecting changes in the host's operational software configuration or whenever certain events take place. Advantages of the scheme of FIG. 4 include minimizing messaging between the local server 140 and its hosts 160, reducing the processing effort related to security in the local server, and prompt security-configuration update. A disadvantage, however, is an increased volume of security software to be installed in the hosts 160, such as rules and their underlying expressions.

Figure 5:
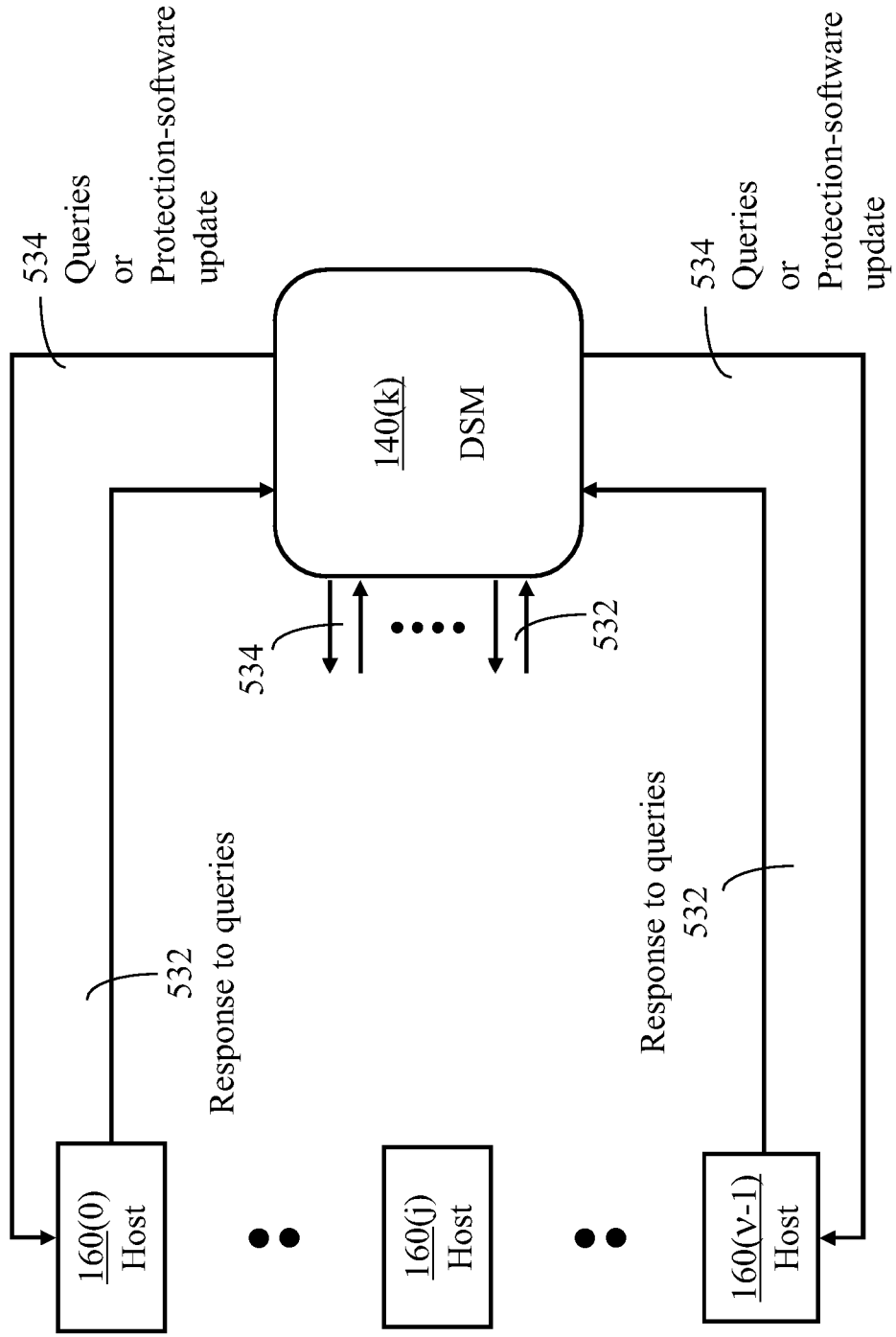
FIG. 5 illustrates a second scheme, in accordance with an embodiment of the present invention, of selective distribution of protection software from a DSM to a respective subset of hosts where the DSM initiates queries to each host, receives responses to the queries, and specifies protection software for each host.

FIG. 5 illustrates a preferred scheme, in accordance with an embodiment of the present invention, of selective distribution of protection software from a local server 140 to a respective subset of hosts 160 where the local server 140 sends queries to a host 160 through a link 534, receives a response to the queries from the host 160 through a link 532, and updates protection software allocation to the host. An advantage of the scheme of FIG. 5 is a reduced security-software content in the hosts. A disadvantage is the requirement of a higher rate of information exchange between the hosts and the local server. Methods for reducing the information-exchange rate will be described with reference to FIGS. 15, 20, and 22.

Figure 6:
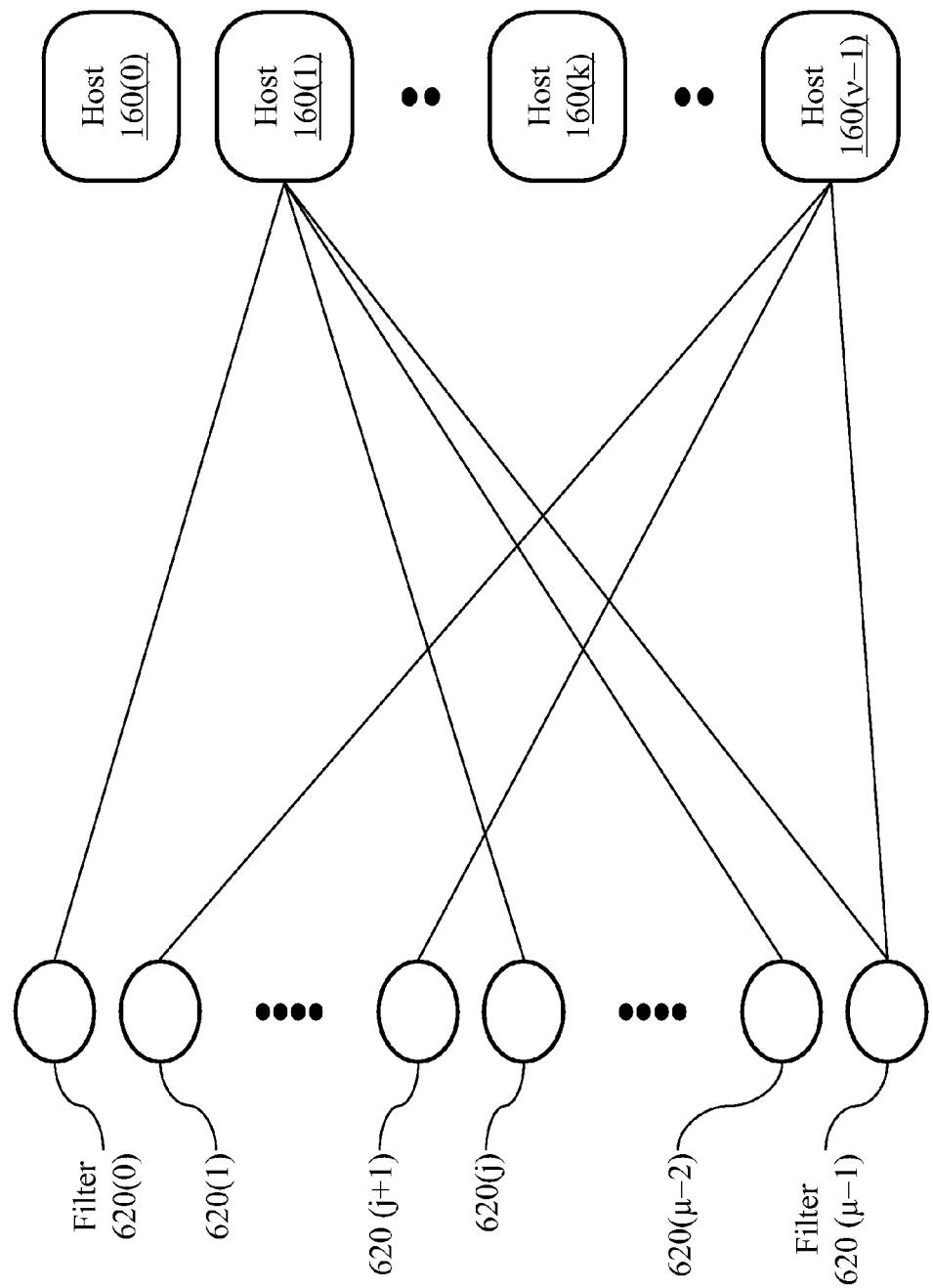
FIG. 6 illustrates an exemplary assignment of filters maintained at a DSM to hosts supported by the DSM, in accordance with an embodiment of the present invention.

FIG. 6 illustrates an exemplary assignment of filters belonging to protection software maintained by a DSM 140 supporting ν hosts 160 individually identified as 160(0) to 160(ν−1). The detection software may be downloaded from the central server 120 and maintained in memory devices. The detection software comprises a number, μ, of filters individually identified as 620(0), 620(1), . . . , 620(μ−1), as well as a number M of rules for specifying a subset of filters 620 for each host 160 according to respective host metadata. A filter 620 may be a set of codes devised for a specific function. A detection engine (recommendation engine), to be described with reference to FIG. 18, associated with the DSM determines which filters 620 need be installed in a given host 160. For example, filters 620(0), 620(j), 620 (μ−2), and 620 (μ−1) are installed in host 160(1).

Figure 7:
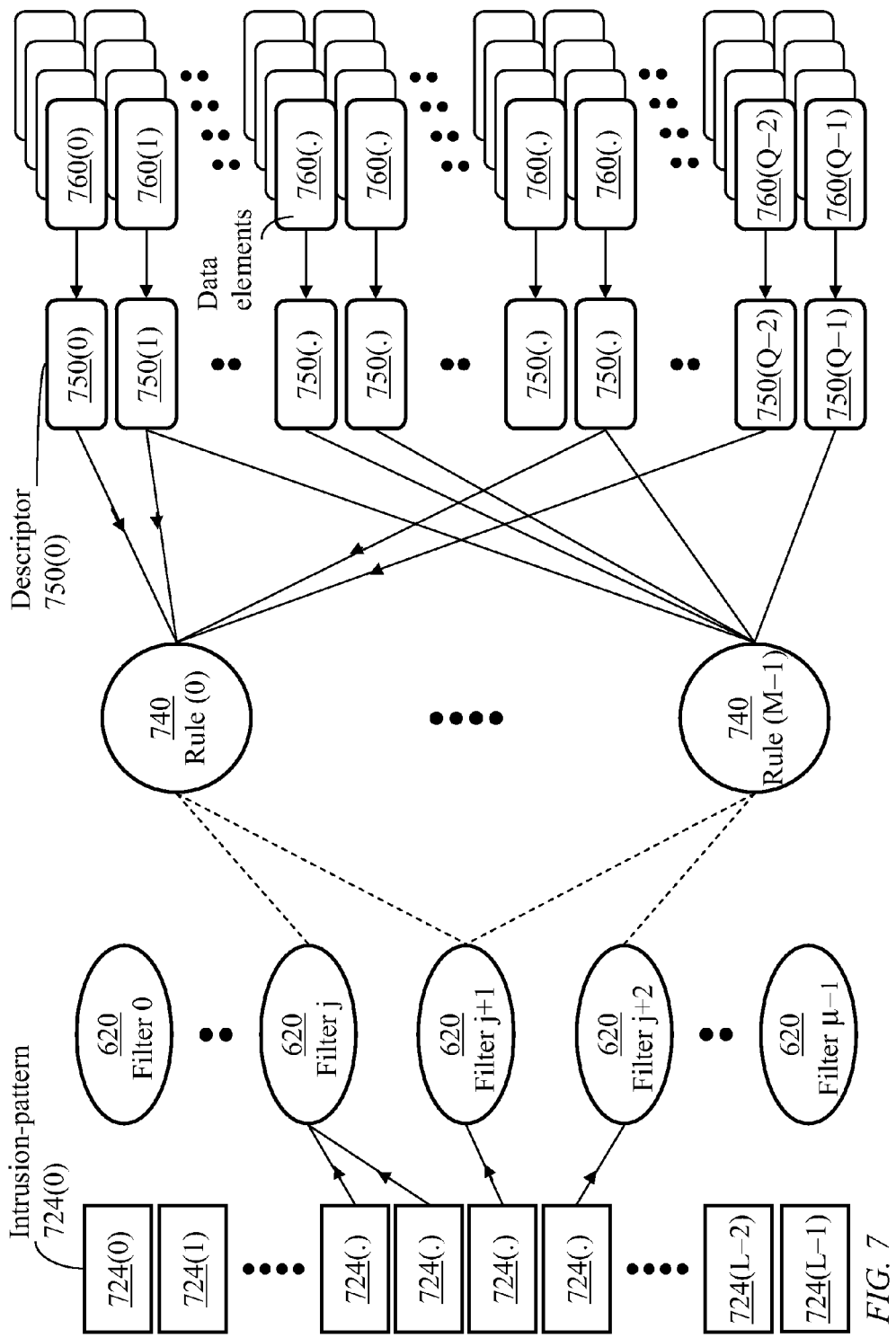
FIG. 7 illustrates software components of the host intrusion prevention system of FIG. 1.

FIG. 7 illustrates composition of protection-software maintained at a DSM 140. The figure details the application of a set of M rules 740 in a specific DSM 140. The rules assign filters 620 to hosts 160 subtending to the DSM according to metadata provided by the hosts. The metadata comprises data elements each of which characterizing an aspect of a host. Each data element corresponds to a descriptor from a superset 820 (FIG. 8) of Q>1 descriptors 750, denoted D. Each rule 740 is associated with a subset of descriptors 750. A descriptor 750 applies to any selected host and has one-to-one correspondence to a data element 760 of the selected host. A specific rule 740 uses a subset of expressions to determine the need, or otherwise, of a filter 620 from among a plurality of μ filters 620 maintained at the DSM. Each filter 620 is developed to combat an intrusion pattern 724 from among a set of L intrusion patterns 724 individually identified as 724(0) to 724(L−1). A descriptor 750 may be associated with more than one rule 740, a rule 740 may be associated with more than one filter 520, and a filter 620 may be associated with more than one intrusion pattern. Conversely, an intrusion pattern 724 may be associated with more than one filter 620 and a filter 620 may be recommended by more than one rule 740.

A detection rule 740 uses expressions to process metadata acquired from a specific host. The rule executed by a specific DSM and applied to a specific host determines whether to install a new filter, keep an existing filter, or remove an installed filter.

A rule comprises:

(1) definition of host-characterizing information such as host name, host type, some additional text, etc.;

(2) a top level expression to call, and corresponding parameters to pass to the expression;

(3) an expected outcome of application of the rule; and (4) an action, such as a host-configuration-element assignment where an intrusion-prevention filter is assigned to a host.

The rule executes the top-level expression and subsequent expressions, and if the execution result is in agreement with the expected outcome, the DSM performs the specified action.

Figure 8:
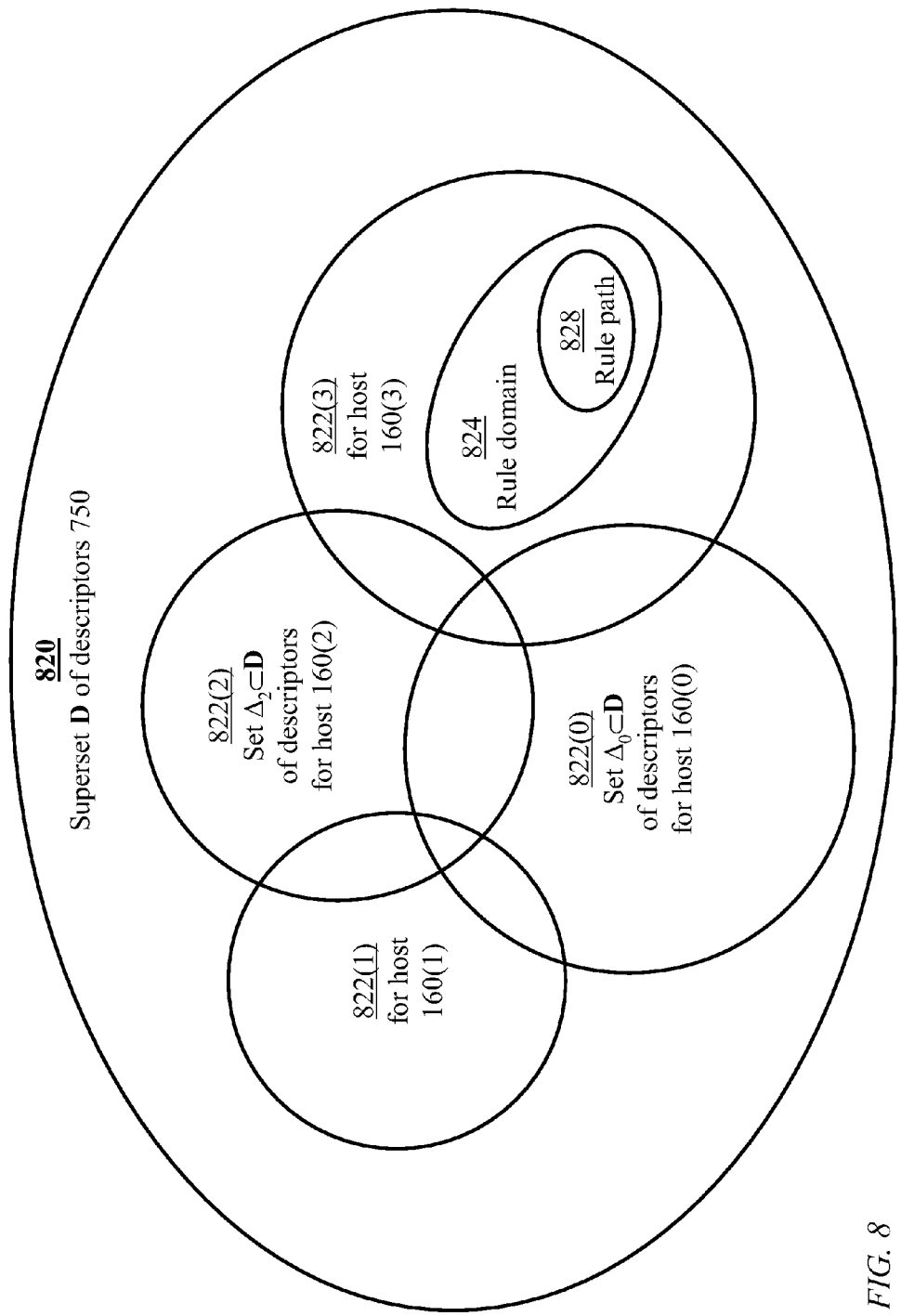
FIG. 8 illustrates division of a superset of host descriptors into host-specific sets of descriptors in accordance with an embodiment of the present invention.

As illustrated in FIG. 7, the rules rely on a superset D (FIG. 8, reference 820) of Q descriptors 750. The ν hosts 160 supported by the DSM 140 may be classified into Ω host classes and the superset D may be divided into Ω host-specific sets $\Delta_j$, $0 \leq j < \Omega \leq \nu$, with set $\Delta_j$ comprising descriptors 750 applicable to any host 160 belonging to host class j, $0 \leq j < \Omega$. FIG. 8 illustrates exemplary four descriptor sets $\Delta_0$, $\Delta_1$, $\Delta_2$, and $\Delta_3$, referenced as 822(0), 822(1), 822(2), and 822(3), respectively, within the superset D of descriptors 750. Pairs of host-specific sets 822 may have common descriptors 750. In the example of FIG. 8, descriptor set $\Delta_0$ has common descriptors with each of descriptor sets $\Delta_1$, $\Delta_2$, and $\Delta_3$, and descriptor set $\Delta_2$ has common descriptors with each of sets $\Delta_0$, $\Delta_1$, and $\Delta_3$. A subset of descriptors 750 associated with a specific rule defines a "domain" of the specific rule. The domain of a rule 740 comprises all descriptors 750 that may be used by the rule 740. Each host-specific set $\Delta_j$, $0 \leq j < \Omega$, may be further divided into rule domains 824, each rule domain comprising descriptors 750 associated with a rule. A rule domain is independent of the state of a host to which the rule is applied. However, for a given host configuration and under a given host state, only a subset of the domain may be exercised. The host-state-dependent subset of descriptors is herein referenced as a "rule path". FIG. 8 illustrates a rule domain 824, from among a plurality of rule domains in host-specific descriptor set $\Delta_3$, and a rule path 828 within the rule domain 824.

The division of the superset D (reference 820) of descriptors into host-specific descriptor sets 822, with further division of each host-specific set into rule domains, as illustrated in FIG. 8, facilitates efficient rule processing.

Figure 9:
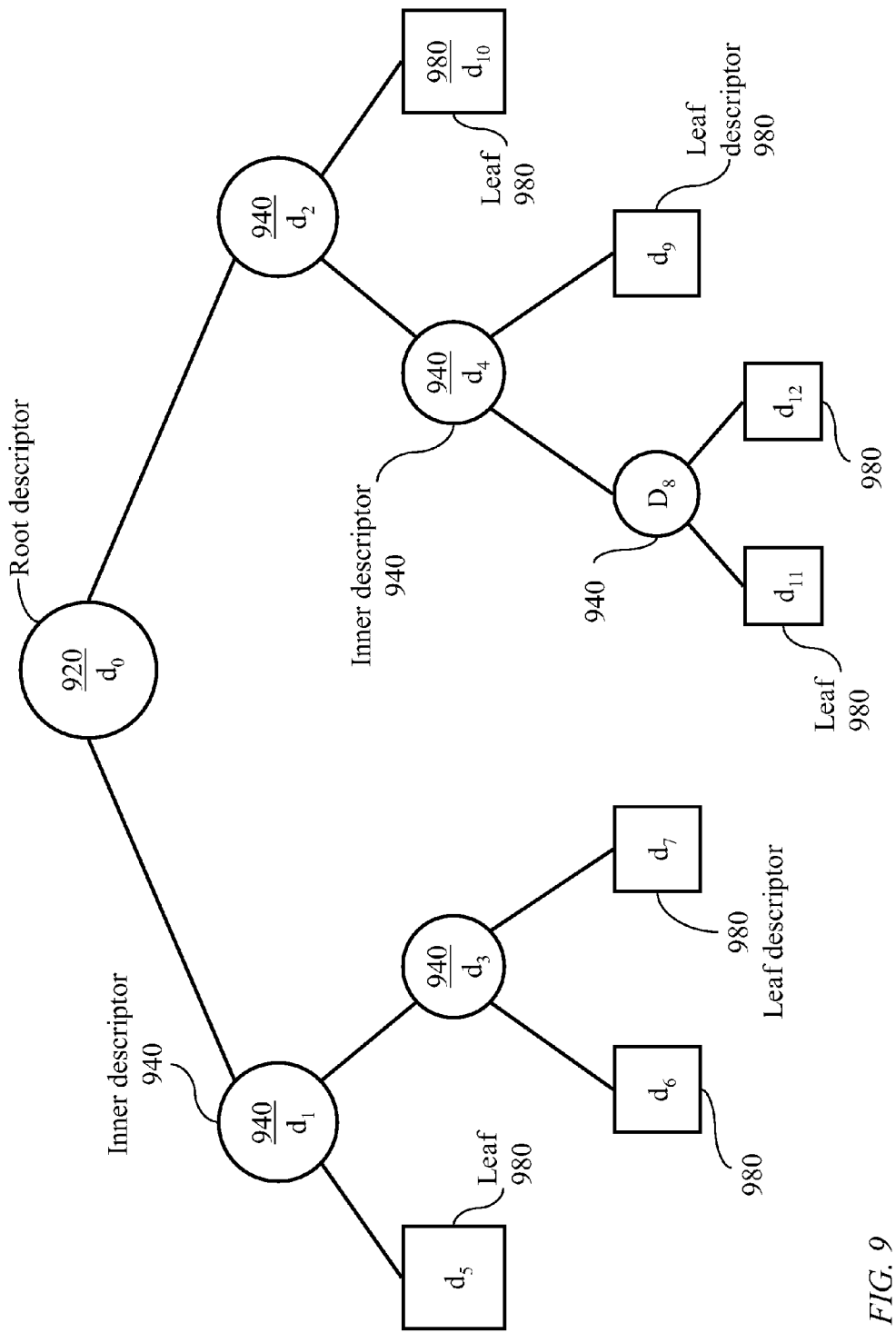
FIG. 9 illustrates an exemplary rule tree comprising descriptors associated with a rule and arranged in a tree structure in accordance with an embodiment of the present invention.

FIG. 9 illustrates a domain of an exemplary rule 740. The domain comprises descriptors 750 arranged in a tree structure having a root 920 (associated with descriptor do), inner nodes 940 (associated with descriptors $d_1$, $d_2$, $d_3$, $d_4$, $d_8$), and leaves 980 (associated with descriptors $d_5$, $d_6$, $d_7$, $d_9$, $d_{10}$, $d_{11}$, $d_{12}$). For a given host 160, a rule path from the root 920 to one of the leaves 980 is determined according to corresponding data elements in the host as will be illustrated with reference to FIG. 27 and FIG. 28.

Figure 10:
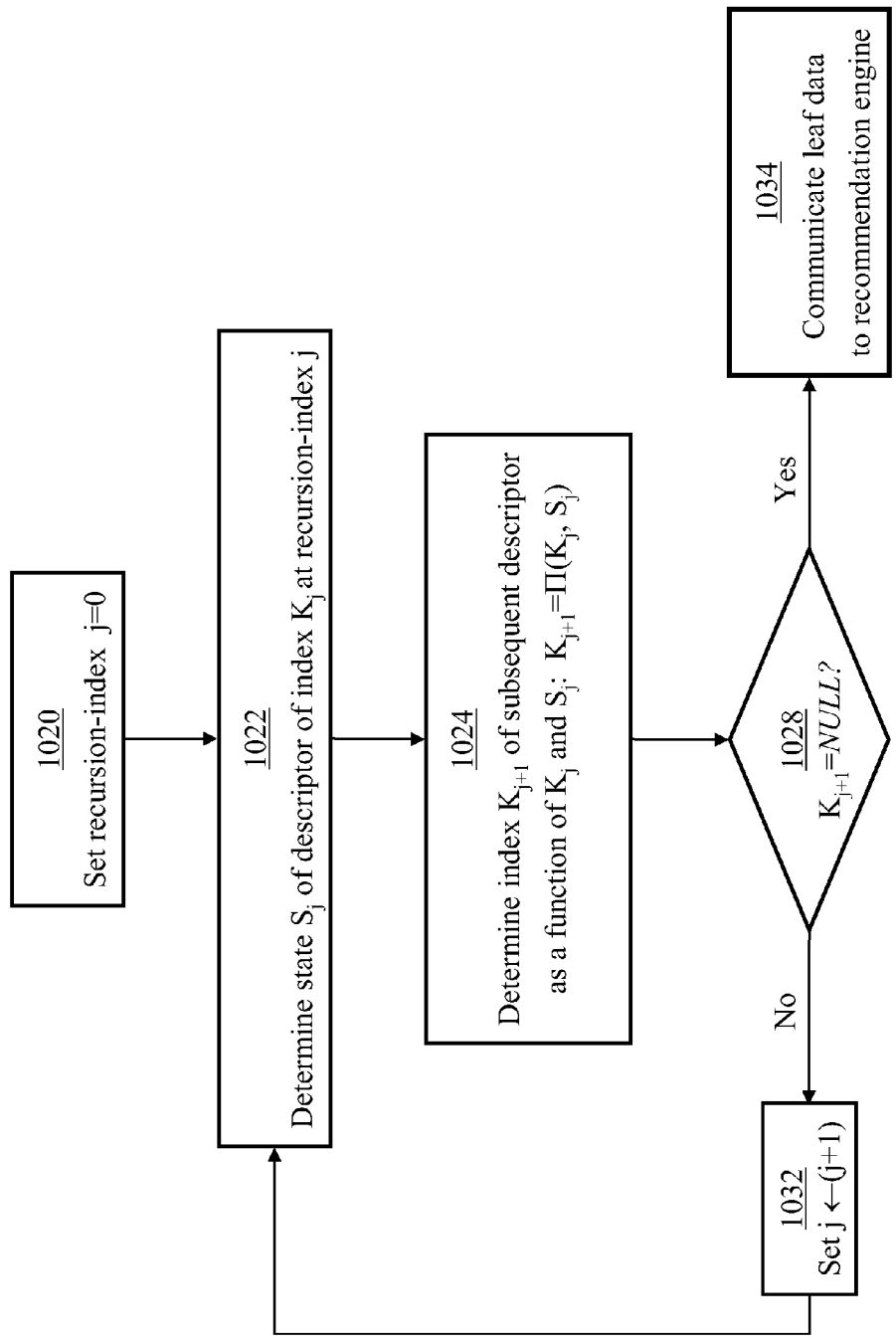
FIG. 10 illustrates a process of determining a rule path in a rule tree corresponding to a current state of a host, in accordance with an embodiment of the present invention.

FIG. 10 is a flow chart describing a recursive procedure for selection of a rule path in a rule domain organized in a tree structure. In step 1020, a recursion-index j of the recursive procedure is set to zero. The descriptor at recursion-index j has a descriptor-index $K_j$. $S_j$ denotes the corresponding content of the descriptor, i.e., the corresponding data element in the target host. For brevity, a descriptor traversed in recursion-cycle j is identified by its descriptor-index $K_j$; thus, $K_j=5$, for example, identifies descriptor $d_5$. The descriptor of index $K_0$, the root descriptor of the tree, is predefined. In step 1022, a state $S_j$ of the descriptor corresponding to recursion-index j is determined. At this point, j=0, and the state $S_0$ is the data element, of the target host, corresponding to descriptor-index $K_0$. In step 1024, a subsequent descriptor index $K_{j+1}$ is determined as a function $\Pi(K_j, S_j)$ of the current descriptor index $K_j$ and its corresponding state $S_j$ acquired from the target host. If descriptor of index $K_j$ is a leaf descriptor, $K_{j+1}$ is given a null value. Thus, in step 1028, if the descriptor-index $K_{j+1}$ equal a Null value, a rule path is defined and the state $S_j$ is communicated to the recommendation engine (step 1034). Otherwise, in step 1032, the recursion-index j is increased by one, step 1022 is revisited, and steps 1024 and 1028 are repeated until step 1034 is reached.

Figure 11:
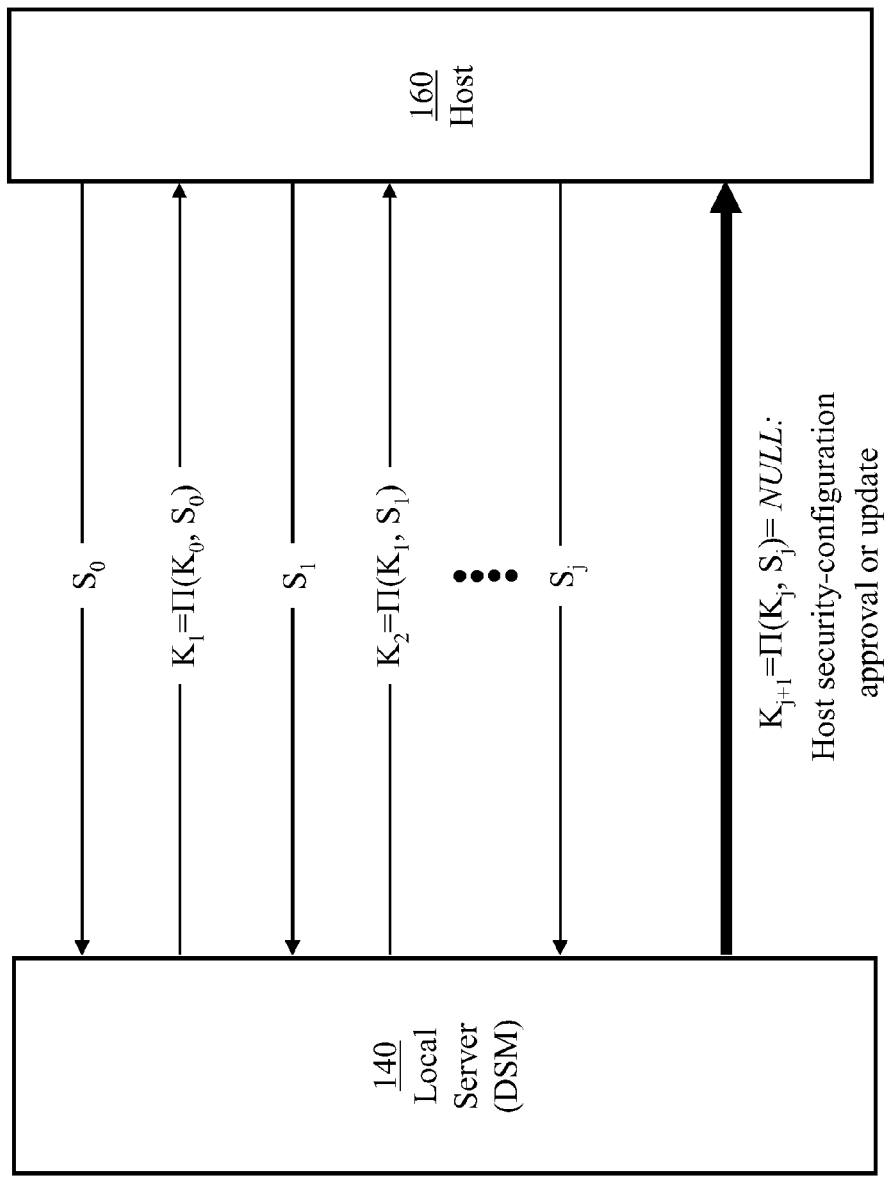
FIG. 11 illustrates communications between a DSM and a host to determine a rule path in a rule tree.

The function $\Pi(K_j, S_j)$ is evaluated either according to an encoded algorithm or by examining a respective lookup table (not illustrated). FIG. 11 further details interactive communications between a DSM 140 and one of its subtending hosts 160. Initially, the host 160 provides state information (data element) $S_0$. Providing this information may be prompted by a query from the DSM 140, where the query identifies an index $K_0$ of a root descriptor. The local server 140 executes a function $\Pi(K_0, S_0)$ to determine an index $K_1$, of a subsequent descriptor. (In the exemplary case of FIG. 12, $K_1$ is determined to equal 2, i.e., the next descriptor along the rule path is $d_2$). The host 140 provides a state $S_1$ (data element) corresponding to descriptor-index $K_1$. The DSM 140 computes the function $\Pi(K_1, S_1)$ to determine an index $K_2$ of a subsequent descriptor. (In the exemplary case of FIG. 12, $K_2$ is determined to equal 4, i.e., the next descriptor along the rule path is $d_4$). The process continues to a recursion-index j at which a descriptor of index $K_j$ is determined to be a leaf descriptor 980, i.e., the subsequent descriptor index $K_{j+1}$ has a Null value. When a leaf descriptor 980 is reached, the DSM 140 uses the data elements 760 (collectively denoted as the metadata) acquired from the host 160 to determine a new security configuration, if any, for the host 160.

Figure 12:
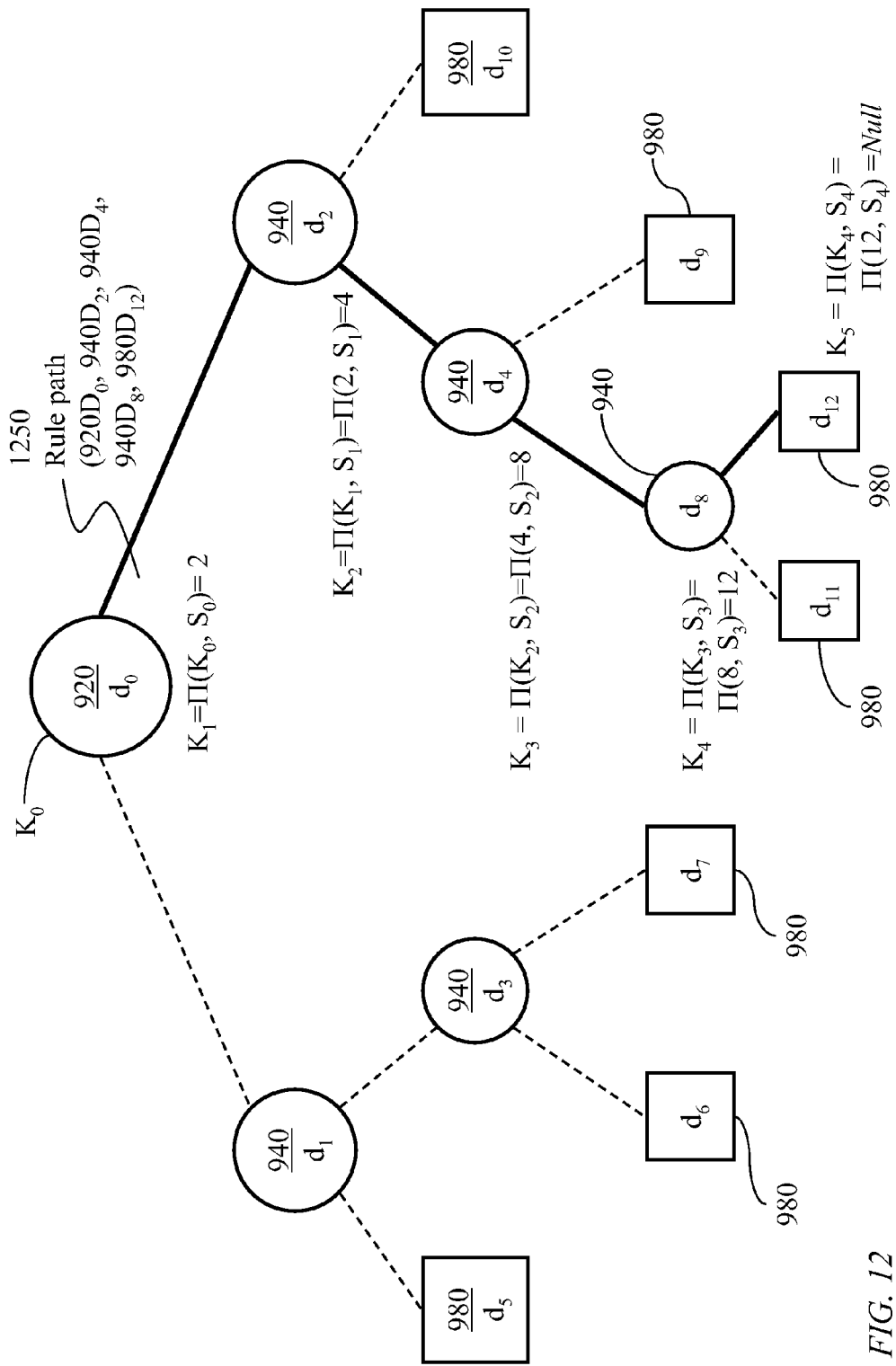
FIG. 12 illustrates a first path in the exemplary rule tree of FIG. 9.

FIG. 12 illustrates an exemplary rule processing corresponding to a first state of a target host 160. Starting with root descriptor of index $K_0=0$, and the corresponding state $S_0$ (data element 760) acquired from the host 160, the function $\Pi(K_0, S_0)$ leads to descriptor index $K_2=2$. Applying the procedure of FIG. 11, current state $S_2$ of descriptor $d_2$ leads to descriptor $d_4$, and so on. The path from the root descriptor $d_0$ ends in leaf descriptor $d_{12}$. The DSM 140 uses the content of descriptors $d_0$, $d_2$, $d_4$, $d_8$, and $d_{12}$ to determine if a new security configuration for the target host 160 is needed.

Figure 13:
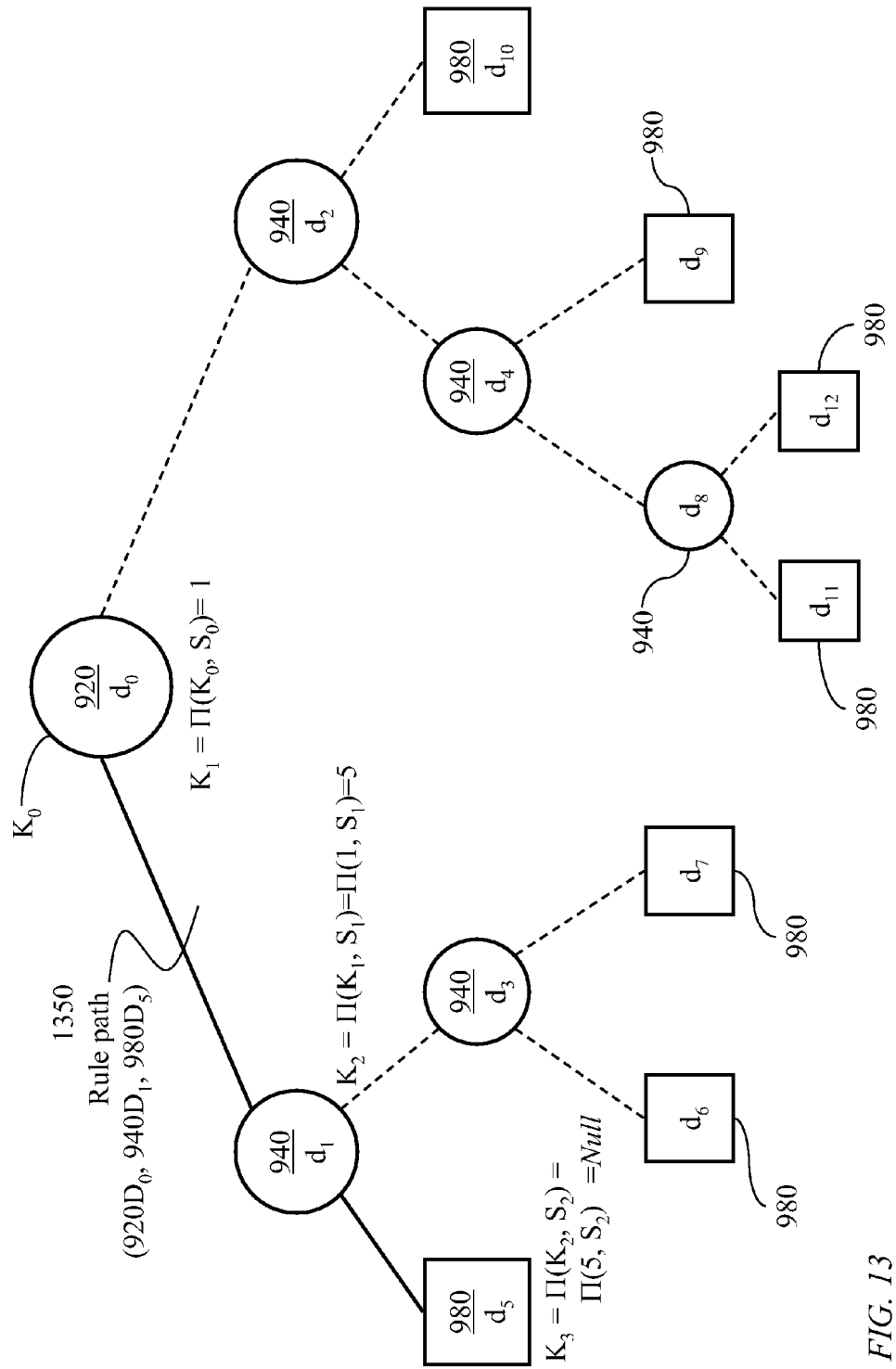
FIG. 13 illustrates a second path of the exemplary rule tree of FIG. 9.

FIG. 13 illustrates an exemplary rule processing corresponding to a second state of a target host 160. Starting with root descriptor $d_0$ of index $K_0=0$, and the corresponding state $S_0$ acquired from the host, the function $\Pi(K_0, S_0)$ leads to descriptor $d_1$. Applying the procedure of FIG. 11, current state (content) $S_1$ of descriptor $d_1$ leads to descriptor $d_5$ which is leaf descriptor. The content of descriptors $d_0$, $d_1$, and $d_5$ are used to determine if a new security configuration is needed.

Figure 14:
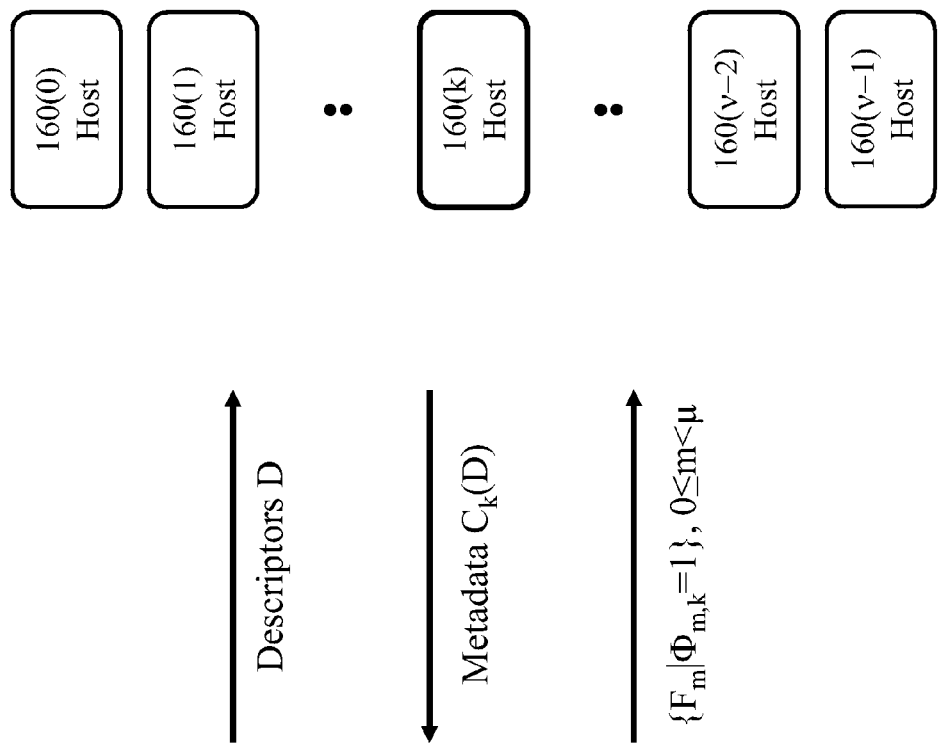
FIG. 14 illustrates a process for optimal assignment of filters to a host in accordance with an embodiment of the present invention.
Figure 14:
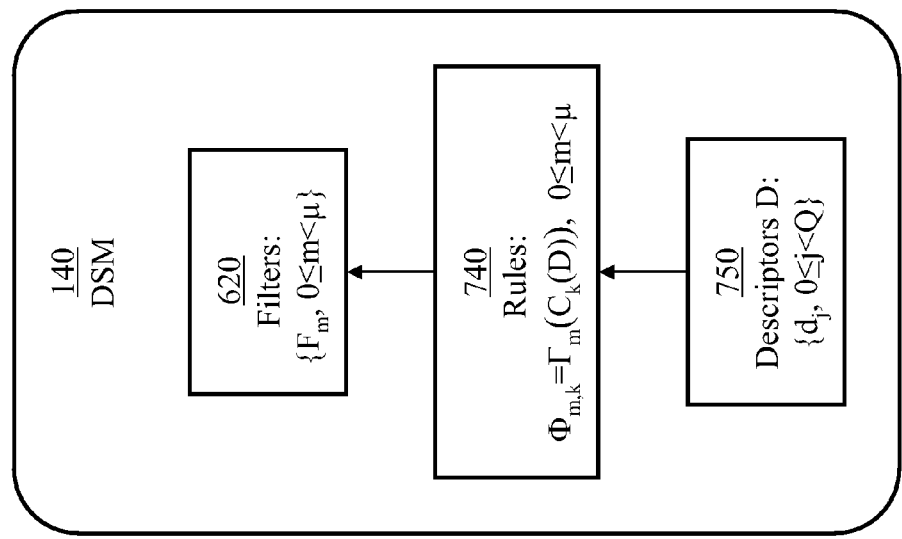

FIG. 14 illustrates a process for optimal assignment of filters to hosts 160. Each DSM 140 stores a set of $\mu>1$ filters 620, denoted $F_m$, $0 \leq m < \mu$, a superset D (reference 820) of Q global descriptors 750, individually identified as $d_j$, $0 \leq j < Q$, and a superset of $\mu$ rules 740, denoted $\Gamma_m$, $0 \leq m < \mu$, devised for selectively assigning intrusion-protection software to hosts. The DSM 140 also stores a profile of each host 160 comprising quasi-static data as well as time-varying host-state information acquired from previous interactions of the DSM 140 with the same host 160. Rather than installing the entire set of filters 620 in each host 160, each host 160 is provided with a relevant subset of the filters 620.

As illustrated in FIG. 7, each rule 740 is associated with a subset of descriptors 750. A set of descriptors that may be used by a rule is herein referenced as the domain of the rule as defined above with reference to FIG. 8. The domain of a rule may conveniently be represented as a tree with a starting descriptor as a root of the tree as described with reference to FIG. 9 and illustrated in FIG. 12 and FIG. 13. A DSM 140 may support hosts 160 of distinctly different characteristics which may require different—though possibly overlapping—subsets of filters 620. Each filter 620 is specified for a host 160 according to a corresponding rule 740 and each rule relies on host metadata corresponding to only a subset of descriptors 750 within the domain of the rule.

In operations DSM 140 supporting a plurality of $\nu>0$ hosts 160(0) to 160($\nu-1$), denoted $H_k$, $0 \leq k < \nu$, selects a host 160(k) from among the $\nu$ hosts according to a predetermined criterion or a schedule. In accordance with an embodiment of the present invention, the DSM 140 may send the entire superset D of descriptors to the selected host 160(k) and the host 160(k) responds by sending metadata $C_k(D)$ which comprise a data element 760 corresponding to each descriptor $d_j$, $0 \leq j < Q$ in the superset D. A "recommendation engine" within the DSM 140, to be described with reference to FIG. 18, executes the rules $\Gamma_m$, $0 \leq m < \mu$ to determine applicable filters 620 to host 160(k) based on the metadata $C_k$ received from host 160(k). Executing a rule $\Gamma_m$ yields an indicator $\Phi_{m,k}$ where a value of $\Phi_{m,k}=1$ (for example) indicates that filter $F_m$ is essential in the security configuration of host $H_k$. A value of $\Phi_{m,k}=0$ indicates that filter $F_m$ need not be installed in host $H_k$ and may be removed if already present in host $H_k$. Thus, only filters Fm for which the indicator $\Phi_{m,k}$ equals 1 are applicable to host H k. The function of the recommendation engine is concisely expressed in FIG. 14 as selecting filters $\{F_m | \Phi_{m,k}=1\}$, for $0 \leq m < \mu$.

The DSM 140 executes the rules one at a time and the DSM sends the domain of descriptors associated with a rule being processed to the selected host 160.

Figure 15:
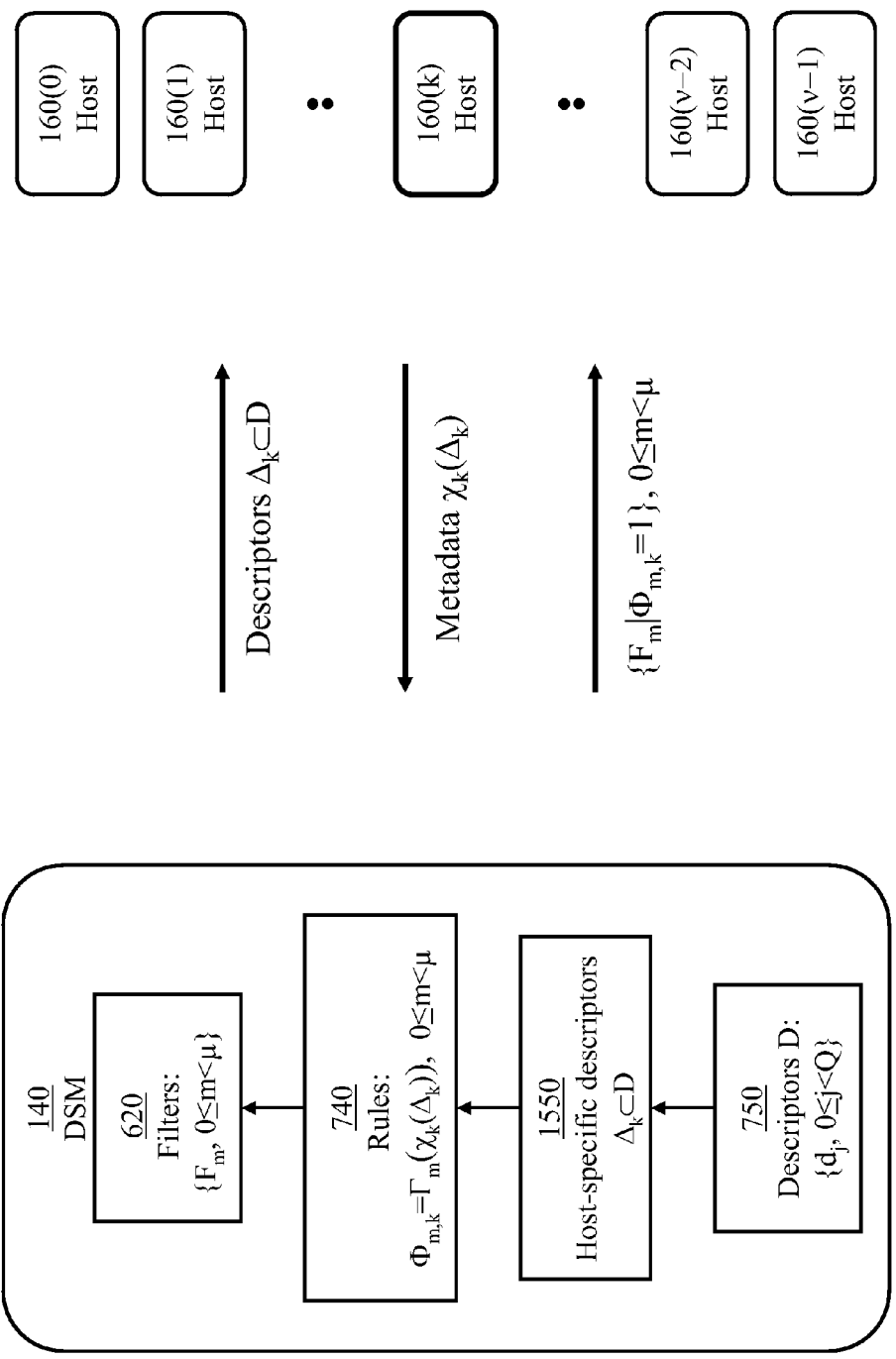
FIG. 15 illustrates a process for optimal assignment of filters to a host with reduced processing effort in accordance with an embodiment of the present invention.

FIG. 15 illustrates a process for optimal assignment of filters to a host 160 which attempts to reduce the processing effort. In order to reduce communications between a DSM 140 and each of its subtending hosts 160, the DSM 140 determines host-specific descriptors $\Delta_k \subset D$ (reference 1550) for each host 160(k). The DSM sends a host-specific set $\Delta_k$ (FIG. 8, reference 822) of descriptors 750 to a selected host 160(k). The host 160(k) responds by sending metadata $\chi_k(\Delta_k)$ which comprise a data element 760 corresponding to each descriptor in the descriptor set $\Delta_k$. The recommendation engine within the DSM 140 executes the rules $\Gamma_m$, $0 \leq m < \mu$ to determine applicable filters 620 to host 160(k) based on the metadata $\chi_k(\Delta_k)$ received from host 160(k). The function of the recommendation engine based on host-specific descriptors is concisely expressed in FIG. 15 as selecting filters $\{F_m | \Phi_{m,k}=1\}$, for $0 \leq m < \mu$, with each rule $\Gamma_m$, $0 \leq m < \mu$ processing metadata $\chi_k(\Delta_k)$ corresponding to descriptors specific to a host $H_k$.

At a given host state, only a subset of descriptors from the rule domain may be applicable. Therefore, in a preferred embodiment, the DSM sends a first query indicating only a first descriptor (root descriptor) to the selected host 160 and determines a second descriptor according to a first data element 760 the DSM receives in response to the first query. The DSM sends a second query indicating the second descriptor to the selected host and receives a second data element 760. If the second data element completes the rule's requirement, another rule, if any, may be executed. Otherwise, the DSM determines a third descriptor, according to the second data element and sends a third query indicating the third descriptor to the selected host which responds with a third data element 760, and so on. The rule execution is complete when the DSM determines that no further data elements are required. With the rule encoded in a tree structure, execution of the rule terminates when the DSM receives a data element corresponding to a leaf descriptor. The process is repeated for each other host 160.

Figure 16:
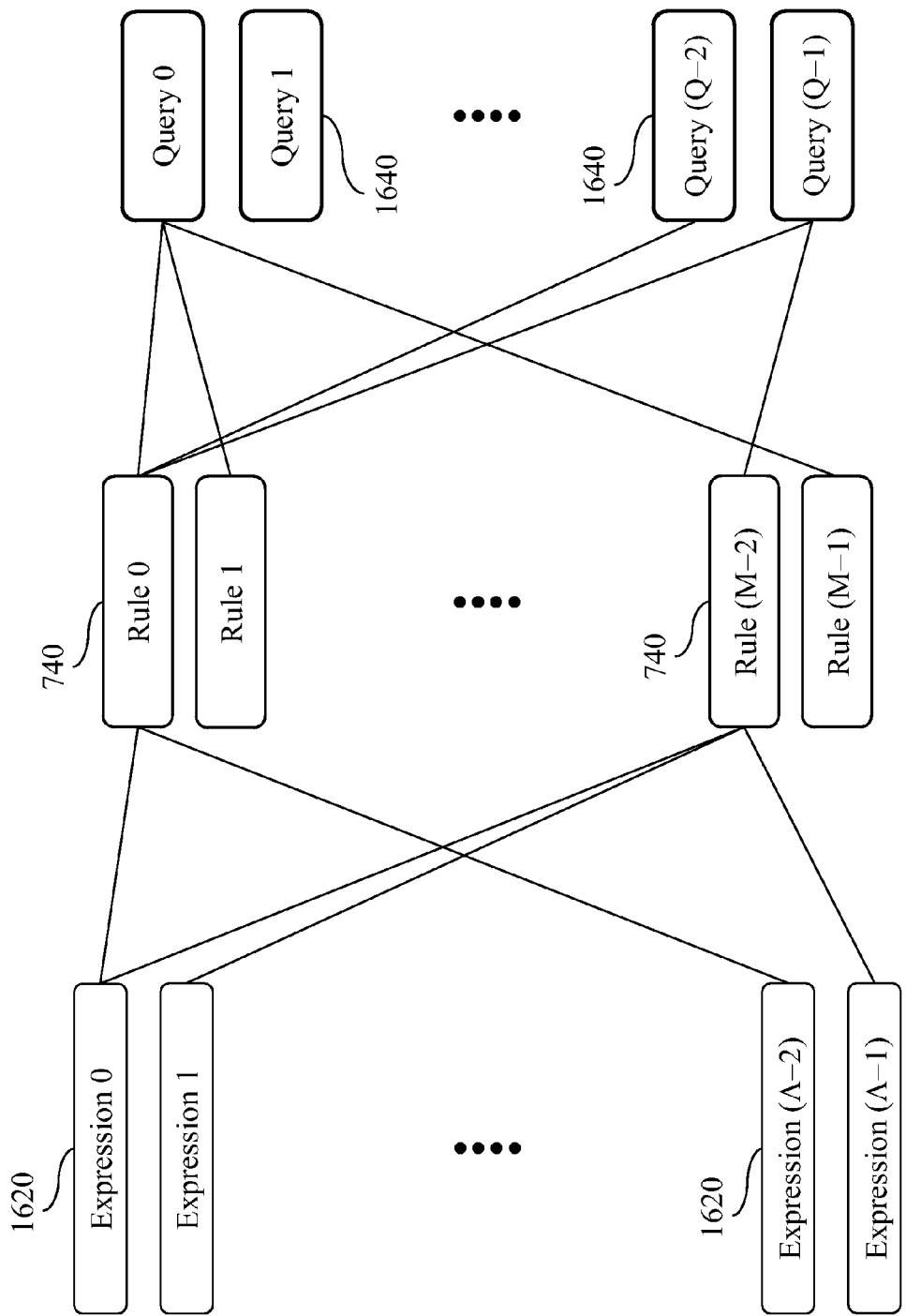
FIG. 16 illustrates interrelationships of rules, expressions, and queries for use in an embodiment of the present invention.

FIG. 16 illustrates protection-software composition maintained at a DSM 140 which may be entirely or partially downloaded from the central server 120. The protection software includes a number Λ of encoded expressions 1620, a number M of encoded rules 740, and a number Q of queries 1640, where each query is associated with one of the descriptors 750. A rule 740 may require the execution of a subset of the Λ expressions 1620. Each rule is associated with a number of descriptors selected from among a number Q of predetermined descriptors. Each descriptor is associated with a query sent by a DSM 140 to a host 160 to acquire a host data element corresponding to the descriptor.

Figure 17:
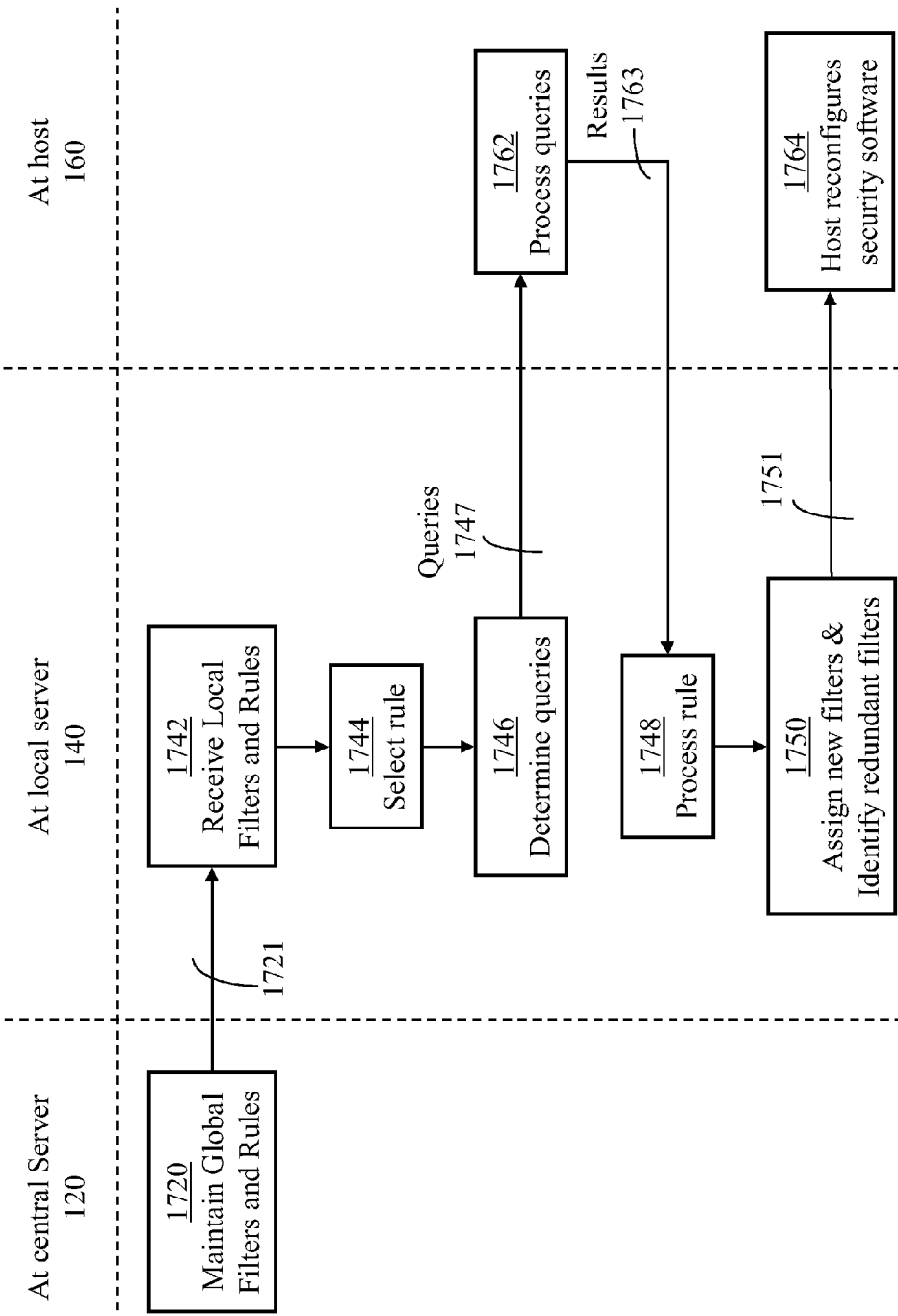
FIG. 17 provides an overview of the operation of the intrusion-protection-system of FIG. 1, in accordance with an embodiment of the present invention.

FIG. 17 illustrates basic operation of the intrusion-prevention system 100. The central server 120 acquires and maintains a library of protection software (step 1720) comprising a superset of filters 620 and encoded rules for assigning filters to hosts. The central server 120 may support numerous DSMs 140 one of which is considered in FIG. 17. The superset of filters 620 maintained in the central server 120 may be developed and updated according to intrusion information 170 (FIG. 1) which is represented as a set of intrusion patterns 724 (FIG. 7). The central server 120 may transmit a copy of the entire library of intrusion-protection software, or a part thereof, to each DSM 140. A first DSM 140 may support hosts of characteristics that significantly differ from those of a second DSM 140. The first and second DSMs 140 may therefore acquire different sets of filters 620. Alternatively, each local server 140 may acquire the entire superset of filters.

The function of a DSM 140 is illustrated in steps 1742 to 1750 in FIG. 17. The DSM 140 receives new and updated protection-software from the central server 120 (step 1742). The DSM 140 selects a host 160 according to a predetermined schedule or some other criterion.

Each host 160 is provided with a security configuration comprising a selected subset of the filters 620 determined according to the host's characteristics and observed events. In step 1744, the local server 140 selects a rule from the set of rules 740 acquired in step 1742. In step 1746, a set of descriptors (and corresponding set of queries) needed to execute the selected rule 740 are identified. Each host data element 760, corresponding to a descriptor 750 of a selected host, is acquired by the DSM 140 by sending a respective query to the selected host 160 as indicated by communication 1747. The selected host 160 processes the query (step 1762) and sends the required data element to the DSM 140 as indicated by communication 1763 to be processed in step 1748.

A rule 740 may be encoded as a rule tree as described with reference to FIG. 9. If the data element sent by the selected host is a "leaf" in the rule-tree, i.e., if a rule path is determined, the information acquired by the DSM 140 would be sufficient to make a decision in step 1750. Step 1750 determines if a specific filter 620 is needed in the security configuration of the host or if a current filter 620 already in the host security configuration may be removed. If the data element sent by the selected host is not a leaf, the rule's tree structure is followed until a leaf is encountered. If any change in the host security configuration is recommended in step 1750, the DSM 140 sends relevant software (filters 620) to the target host 160 as indicated by communication 1751 for reconfiguration of the host security software (step 1 764).

Figure 18:
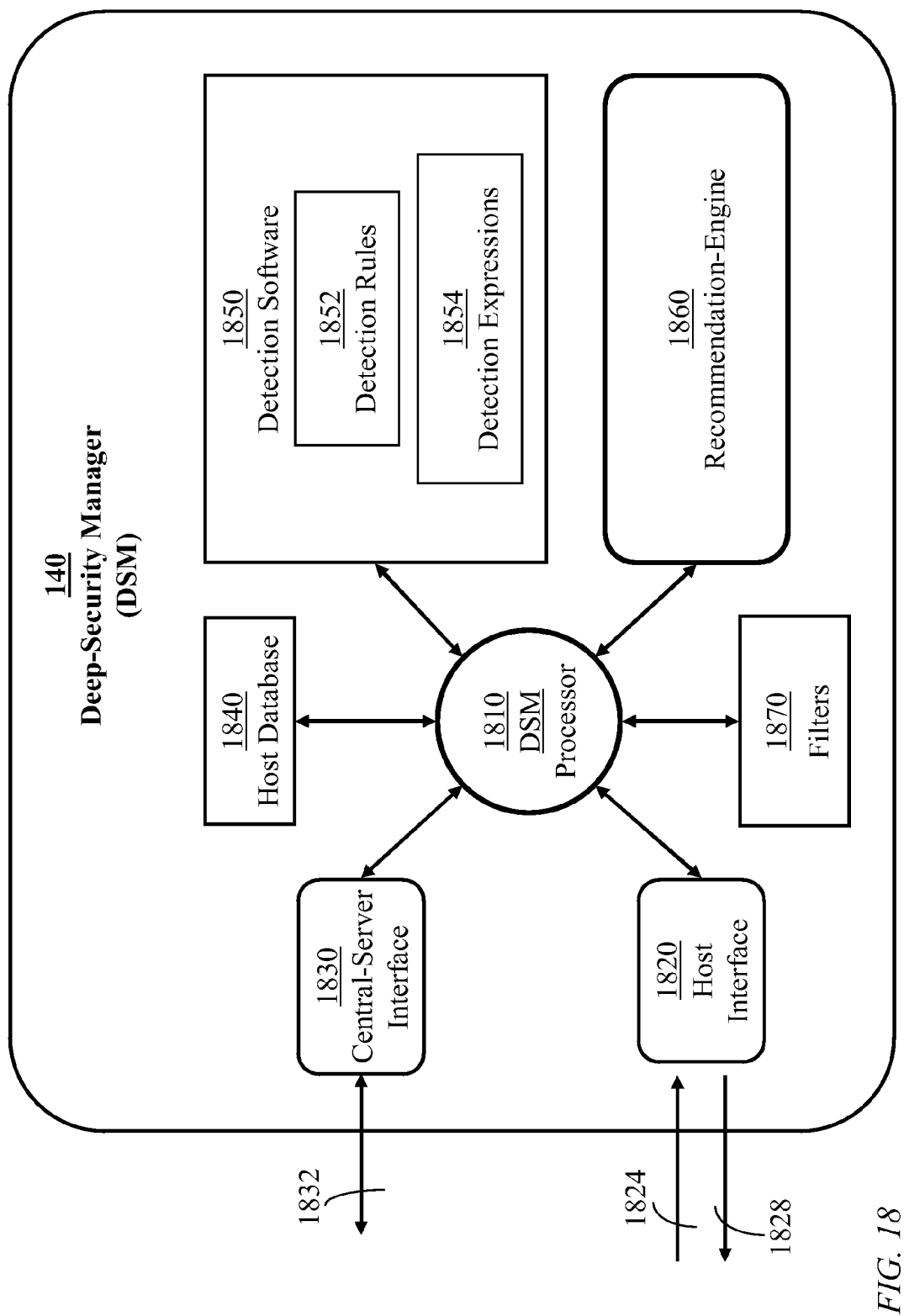
FIG. 18 illustrates components of a local server, functioning as a deep-security manager (DSM), in the intrusion protection system of FIG. 1, in accordance with an embodiment of the present invention.

FIG. 18 illustrates components of an exemplary local server 140, functioning as a deep-security manager (DSM), in the system 100 of FIG. 1. The (local server) DSM 140 comprises: a DSM processor 1810; an interface 1830 communicatively coupled to central server 120 for receiving software from the central server through a communications link 1832 (link 122 of FIG. 1); an interface 1820( or a plurality of interfaces 1820) communicatively coupled to hosts 160 supported by the DSM 140 for exchanging data with each subtending host 160 through a bidirectional link 1824/1828 (bidirectional link 1824/1828 is a link 142 illustrated in FIG. 1); a recommendation engine 1860 (also referenced as engine 1860) which receives host "metadata" in the form of data elements from a host 160 supported by the exemplary DSM 140 and uses detection software 1850 to produce a list of host-configuration elements (mainly filters 620, FIG. 6) to be transmitted through link 1828 to the host 160. Filters received from the central server 120 are stored in a memory 1870. The detection software 1850 may be downloaded from the central server 120 and comprises encoded detection rules 1852 and underlying detection expressions 1854. In an alternate configuration of a DSM 140, the detection rules 1850 may be embedded in the recommendation engine 1860. The DSM may also maintain a database 1840 for storing a current profile for some or all of the hosts 160 supported by the DSM.

The profile of a host includes descriptors, and corresponding queries, that are relevant to the host, as well as chronological data of query responses (metadata) acquired from the host and decisions made by the recommendation engine 1860 based on the query responses.

The DSM 140 sends a set of queries over a link 1828 to a specific host 160. The specific host responds with metadata comprising specific data elements 760 that characterize the host's type and its present software content. The DSM 140 receives host responses through incoming link 1824 and activates the recommendation engine 1860 to determine whether or not to perform an action.

The engine 1860 may maintain software instructions for classifying hosts according to predefined host types. The engine 1860 analyzes the hosts' profiles and associates each host with a host type. The engine may associate a subset of descriptors, herein referenced as host-specific descriptors, with each host-type. The engine may also have software instructions for associating a subset of descriptors with each rule, thus creating rule-specific subsets of descriptors, to reduce the processing effort at both the DSM 140 and the hosts 160 supported by the DSM. The engine may further have software instructions for determining an intersection of each host-specific subset of descriptors with each rule-specific subset of descriptors to determine a rule domain that is specific to a host 160.

The DSM 140 may also comprise a scheduler, which may be embedded in the engine 1860, for determining a time table for examining each host 160 supported by the DSM 140.

Recommendation Engine

The recommendation engine 1860 may be activated to handle a host 160 in one of two ways: prompting by a security administrator; or scheduling for automatic runs every predetermined period of time.

The recommendation engine 1860 comprises a set of instructions. The instructions implement detection rules 740. Each detection rule requires execution of certain expressions. If the result of executing a rule meets a corresponding expected outcome, a corresponding action is performed.

The detection rules are basically treated as data to be analyzed by the recommendation engine and perform functions specified within the rules. Detection expressions are also treated as data. The detection rules and detection expressions are passed from the central server 120 to the DSMs 140 as data.

In the set of detection expressions, any expression can be a top-level expression. If the underlying language is java, the return values are java types. They can be simple/primitive types, or complex java objects. For example, four "Expected Results": {null, NOT null, true, false} may be expected. The expected results may comprise other types such as fixed strings, integers, real numbers, or complex values. The corresponding logic can be contained within the expressions. When the recommendation engine runs, it evaluates a rule, determines and executes the expression, and produces a result. If the result is exactly equal to a predefined outcome (such as "EXPECTEDRESULT") then a corresponding action is performed.

Prior to assigning filters to hosts, the recommendation engine performs two functions. The first is to gather an optimal set of detection rules. The second is to determine host metadata queries. The two functions may be based on specific monitoring parameters. Using monitoring parameters, the recommendation engine can determine a reduced set of rules to process and queries to send.

The monitoring parameters are the complete set of queries ever asked of a given agent. The first time the recommendation engine operates on a host, the engine gathers and stores all the queries executed on the agent residing in the host. The queries are processed during each run for a given host. If all the results are the same as those obtained in a previous run, and if none of the detection rules has changed, then the rules need not be executed. Hence, by monitoring the queries and the results, a considerable amount of processing may be avoided.

Figure 19:
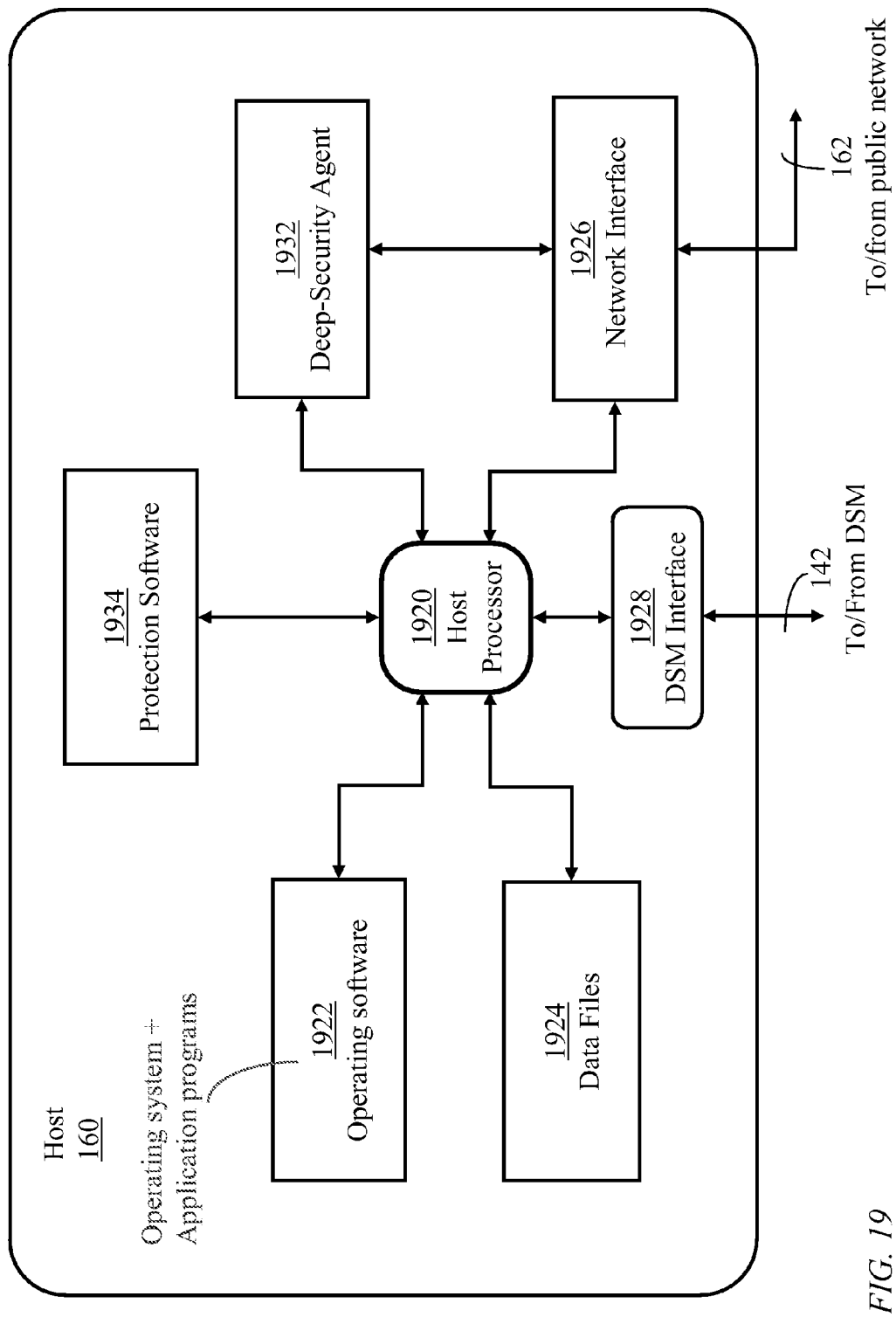
FIG. 19 illustrates a configuration of a host in the system of FIG. 1 where the host includes an agent of a DSM in accordance with an embodiment of the present invention.

FIG. 19 illustrates a configuration of a host 1 60 in the host intrusion-prevention system (HIPS) 100 of FIG. 1. The host 160 comprises a host processor 1920, a memory device 1922 for storing operating software, a memory device 1924 for storing data files, a memory device 1932 for storing an agent of a corresponding DSM, a memory device 1934 for storing protection software including firewall and DPI modules, and an interface 1928 which is communicatively coupled to the corresponding DSM through a two-way channel 142 (FIG. 1). A host 160 may be provided with a network interface 1926 for communicating with a public network through a link 162 as illustrated in FIG. 1.

Figure 20:
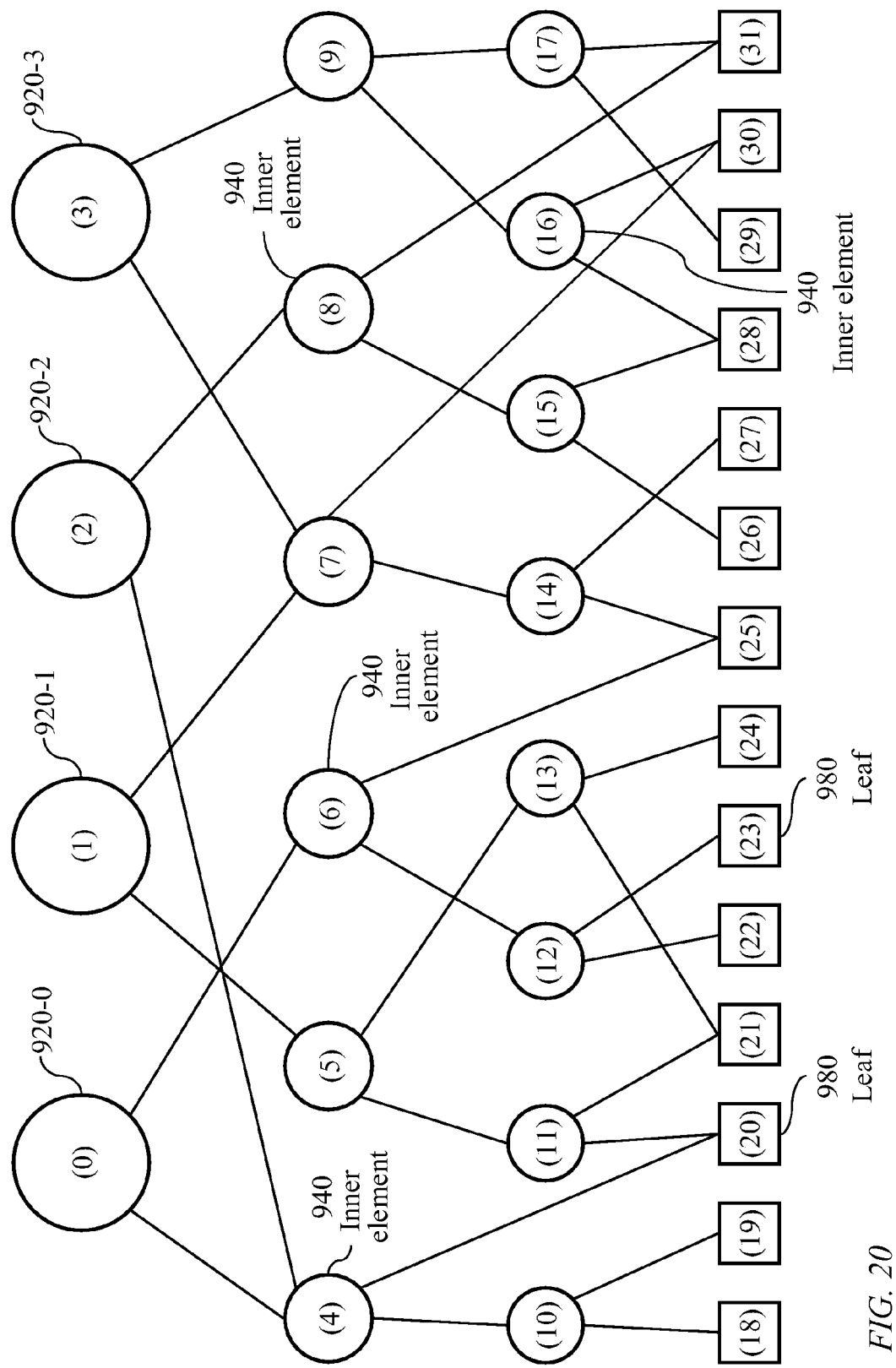
FIG. 20 illustrates a set of intersecting rule trees for use in an embodiment of the present invention.

FIG. 20 illustrates exemplary intersecting domains of four rules 740 individually indexed as rules 740(0), 740(1), 740 (2), and 740(3). Each rule 740(j) is associated with a predetermined root descriptor 920(j). The four rules share a set of 14 intermediate descriptors 940 and 14 leaf descriptors 980. For clarity of FIG. 20, the superset of 32 descriptors 920, 940, and 940 associated with the four rules are indicated by indices 0 to 31. The domain of rule 740(0) comprises descriptors with indices 0, 4, 6, 10, 12, 18, 19, 20, 22, 23, and 25. The domain of rule 740(1) comprises descriptors of indices 1, 5, 7, 11, 13, 14, 20, 21, 24, 25, 27, and 30. The domains of the four rules 740(0), 740(1), 740(2), and 740(3) are listed in table 2101 of FIG. 21. The domains of rules 740(0) and 740(1) intersect only in two leaf descriptors of indices 20 and 25.

Consider multiple rules, having intersecting descriptors, to be applied to an examined host. A process of acquiring a descriptor from a host is a process of acquiring from the host a data element corresponding to the descriptor. A first set of descriptors relevant to a first rule is acquired from the examined host and used to execute the first rule. A second set of descriptors relevant to a second rule is found to intersect the first set of descriptors in at least one common descriptor. A subset of the second set of descriptors which excludes any descriptors common with the first set of descriptors is acquired from the examined host. Executing the second rule may still be based on the entire second set of descriptors, but the process of acquiring common descriptors from the host is performed only once. Likewise, a third set of descriptors relevant to a third rule may have descriptors common with the first set of descriptors and the second set of descriptors and data elements, of the examined host, corresponding to such common descriptors are readily available. Generally, any set of descriptors relevant to a rule, other than the first rule, may have descriptors common with descriptors relevant to preceding rules and data elements, of the examined host, corresponding to such common descriptors would be readily available.

Figure 21:
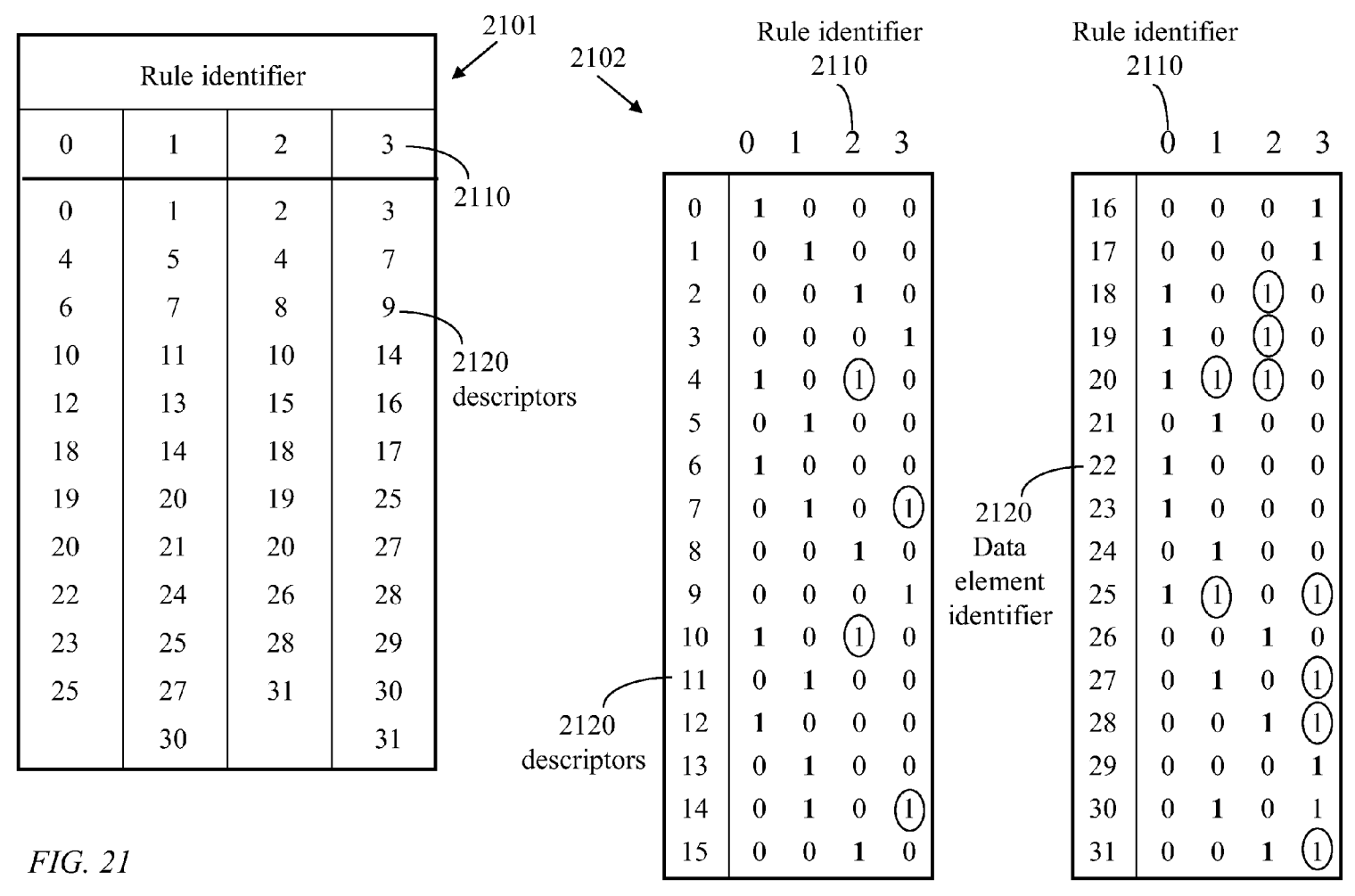

FIG. 21 presents the intersecting domains of FIG. 20 in a tabular form. A table 2101 stores identifiers 2120 of descriptors 750 constituting the domain of each of the four rules 740(0), 740(1), 740(2), and 740(3), identified only by indices 0, 1, 2, and 3 (reference 2110). A table 2102 identifies rules, from among the four rules, associated with each descriptor 750 in the superset of 32 descriptors. For example, the descriptor of index 14 belongs to rule 740(1) and rule 740(3). When rule 740(1) is executed for a target host 160, the data element received from the target host 160 in response to a query associated with the descriptor of index 14 is retained by a respective DSM for use in executing rule 740(3) for the same target host 160.

Figure 22:
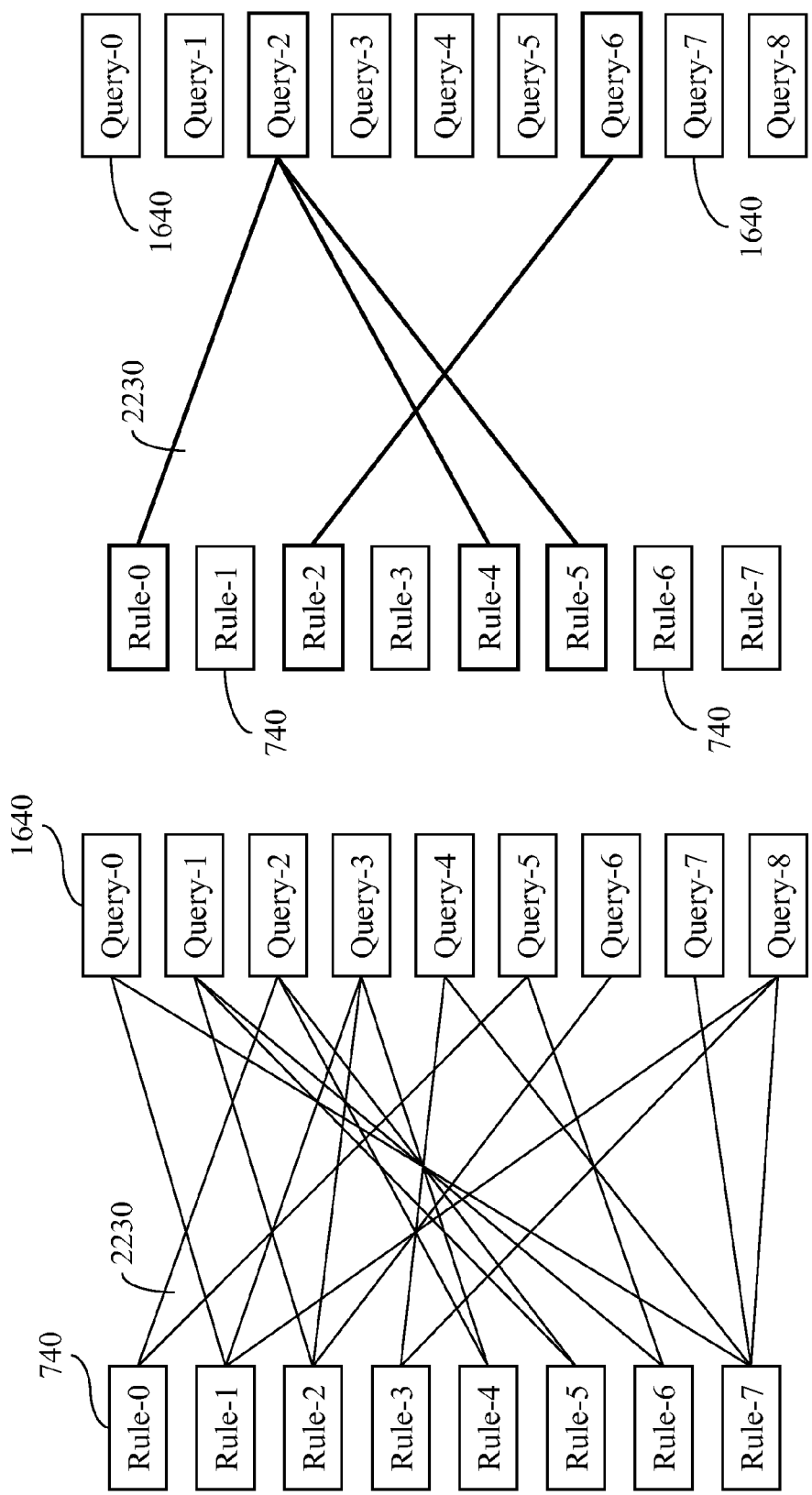
FIG. 22 illustrates selection of applicable rules from a maximal set of rules based on query results in accordance with an embodiment of the present invention.

FIG. 22 illustrates exemplary exhaustive and selective rule execution. A set of eight rules 740, individually labeled as 740(0) to 740(7) are applicable to a specific target host. Each rule relies on data elements characterizing the target host and acquired through a number of queries 1640; there are nine queries 1640(0), to 1640(8) in the example of FIG. 22. Rule 740(0) relies on data elements in host's response to queries 1640(2), 1640(5), rule 740(1) relies on response to queries 1640(0), 1640(3), and 1640((8), rule 740(2) relies on queries 1640(1), 1640(3), and 1640(6), and so on, as indicated by lines 2230. In a straightforward procedure, the eight rules may be considered in any order to determine if a change of security configuration of the target host is needed. The queries associated with each of the eight rules may be processed and a rule would be executed to completion if any of its queries returns a data element that differs from a respective current data element for the same target host. Alternatively, all the queries 1640(0) to 1640(8) may be processed first and rules 740 associated with queries that return data elements that differ from respective data elements stored in the DSM need be executed to completion. In the exemplary arrangement of FIG. 22, only queries 1640(2) and 1640(6) return data elements from the target host indicating a change of state in the target host. This results in executing only four rules 740(0),

740(2), 740(4), and 1040(5) to completion to determine if security-configuration changes are needed.

FIG. 23 illustrates, in a tabular form, domains of eight rules 740 and a list of rules 740 to which each query is associated. A table 2301 contains for each of the eight rules: (a) a rule identifier 2325; (b) a number of queries (reference 2330) corresponding to the domain of the rule; and, (c) identifiers 2335 of queries corresponding to the domain of the rule. A table 2302 contains for each query of the nine queries: (i) a query identifier 2335; (ii) a number of rules 740 (reference 2340) corresponding to the query; and (iii) identifiers 2325 of rules corresponding to the query. Table 2302 facilitates the process of determining relevant rules based on query results as described with reference to FIG. 22.

FIG. 24 illustrates elements of a database maintained at each DSM 140 to track queries and their responses for each host 160. A table 2400 includes, for each host 160 and for each query, a query identifier 2445, an indication 2450 of an instant of time at which the query has been processed, and a response 2460 received from a target host 160.

A rule is executed for a target host when (1) the rule itself is modified in the central server 120 and/or (2) when the state of the host changes, i.e., when current metadata relevant to the rule differs for a last-acquired metadata of the host.

A rule that is modified at the central server 120 may be executed "immediately" for each of the hosts supported by a DSM. Alternatively, the rule may be executed for a given host when the host is polled according to a schedule or any other criterion.

Figure 25:
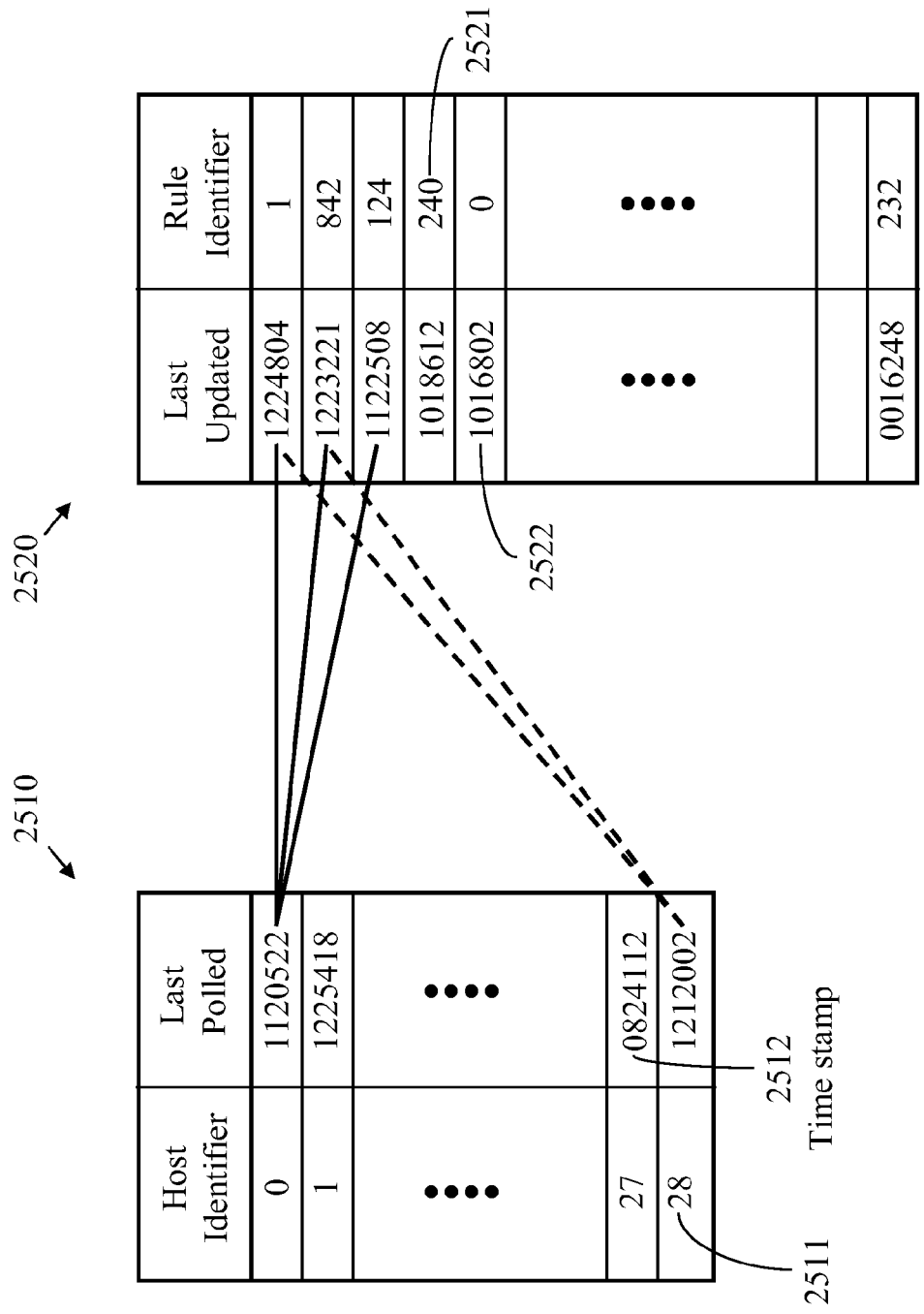
FIG. 25 illustrates data arrays holding timing data of host updates and rule updates to facilitate identifying new rules or updated rules, in accordance with an embodiment of the present invention.

FIG. 25 illustrates a data structure for identifying rules to be executed during host-security update due to changes introduced in the rules at the central server 120 and communicated to each DSM 140 supported by the central server 120. The illustrated structure corresponds to a DSM supporting 29 hosts 160, individually labeled as 160(0) to 160(28); only the indices 0 to 28 are indicated in FIG. 25. The DSM 140 supports 843 rules 740 individually identified as 740(0) to 740(842); only the indices 0 to 842 of the rule identifiers 740(.) are indicated in FIG. 25. A first table 2510 contains, for each host 160, a host identifier 2511 and an indication 2512 of the instant of time at which the host was polled (queried) to obtain data elements. A second table 2520 contains, for each rule 740, a rule identifier 2521 and an indication 2522 of the instant of time at which the rule was updated at the central server 120. Preferably, table 2520 is sorted according to the time indications 2522 in a descending order. As indicated, rule 740(1) was last updated at time 1224804 (arbitrary time units), rule 740(842) was at updated at time 1223221, and so on. When a host 160 is polled, the time T1 at which the host was last polled is compared with the time T2 at which a given rule 740(.) was updated. If T2 is greater than T1, the rule 740(.) is executed. Otherwise, the rule would be executed only if necessitated by changes in the host metadata. To facilitate the process of comparing the time indicators 2512 and 2522, the records of table 2520 are presorted in a descending order according to the value of the time indications 2522. Without presorting, a computationally intensive sequential search would be necessary. The value of T1 for host 160(0) is 1120522 and the value of T2 for the fourth record in table 2520 is 1018612. Thus rules 740(1), 740(842), and 740(124) need be executed for host 160(0) but none of the rules corresponding to records beyond the third record need be considered for host 160(0) on the basis of their last update time. Likewise, the value of T1 for host 740(28) is 1212002 which is smaller than the last update times 1224804 and 1223221 of the first two records in table 2520 but greater than the last update time 1122508 of the third record in table 2520. Thus, only rules 740(1) and 740(842) need be considered for host 160(28).

Figure 26:
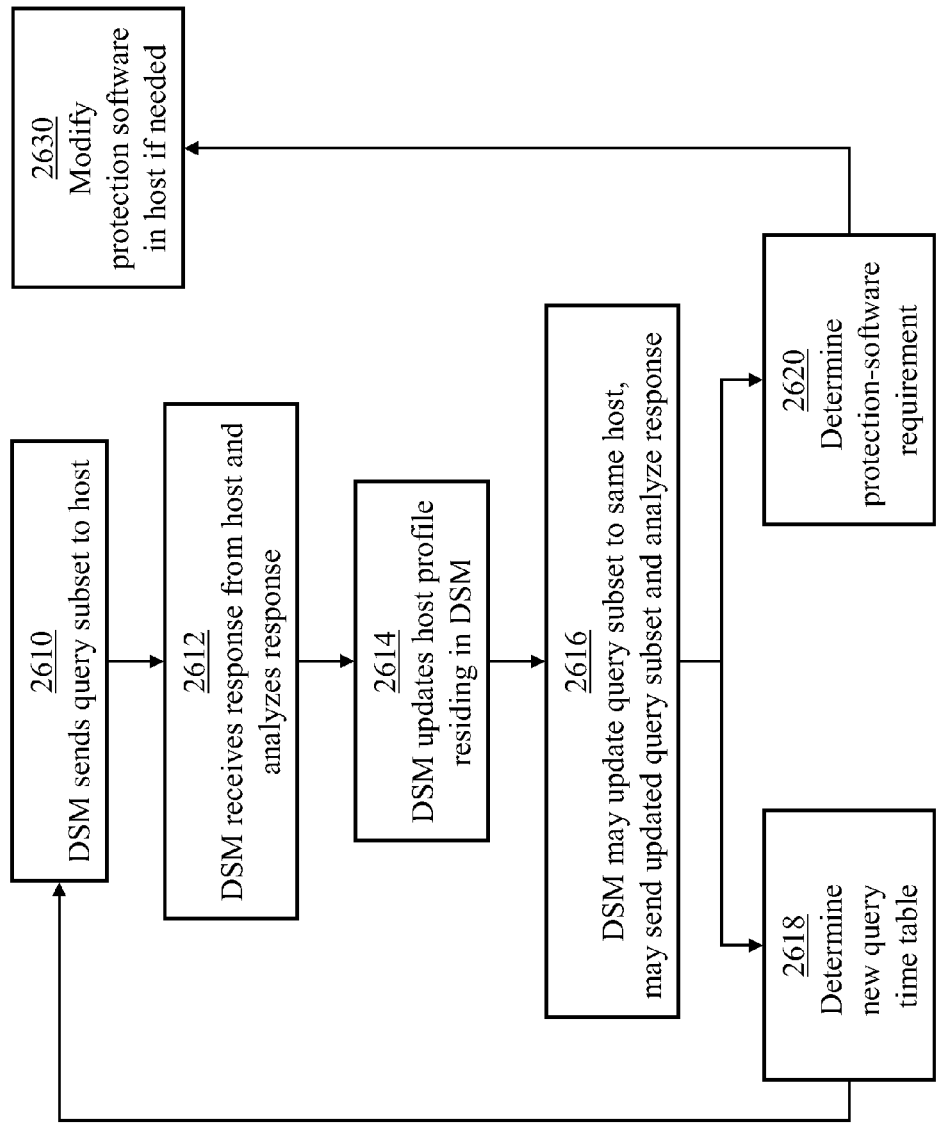
FIG. 26 illustrates a scheme for updating host security configuration in accordance with an embodiment of the present invention.

FIG. 26 illustrates an exemplary scheme implemented by a DSM for updating host-security configuration triggered by host events and/or changes in host operational configuration. In step 2610, the DSM sends a query subset to a host 160. In step 2612, the DSM receives responses from the host, compares the responses with corresponding previously acquired responses, if any, and analyzes each response found to be different from a corresponding previous response. A query processed for the first time is assigned a null "previous response". In step 2614, the DSM updates the host profile according to the responses. In step 2616, the DSM determines if changes in the query subset to the host are needed. In step 2618 the DSM determines a schedule for re-processing the same host, restarting at step 2610. In step 2620, the DSM determines currently needed protection software for the host and updates the host's security configuration (step 2630) if the currently needed protection software differs from protection software already installed in the host.

Figure 27:
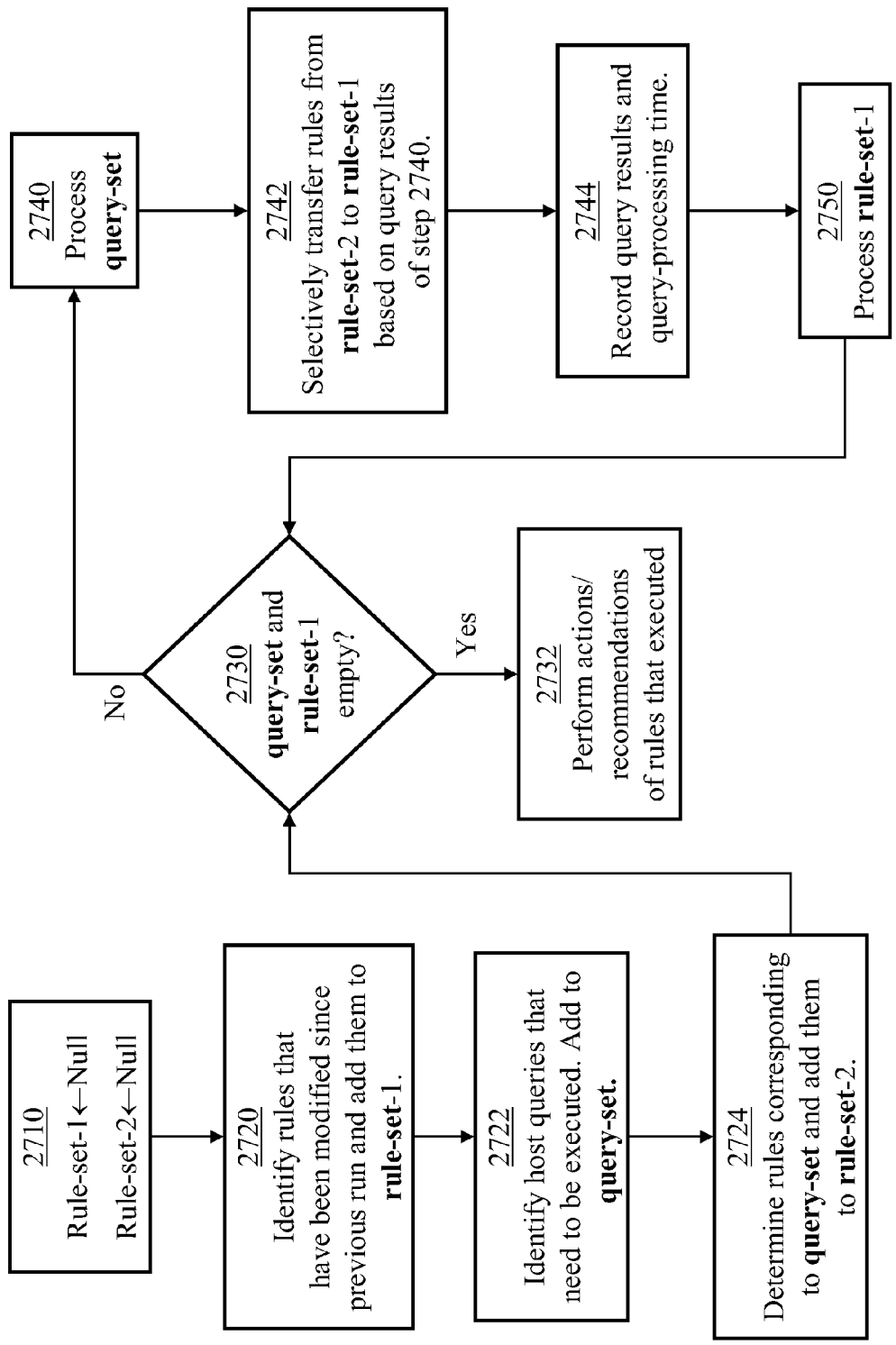
FIG. 27 illustrates a process implemented at a DSM for determining a set of applicable rules from a list of candidate rules to a specific host, in accordance with an embodiment of the present invention.

FIG. 27 is a flow chart describing a process of selecting rules to be executed for each host 160 in the intrusion-protection system 100 of FIG. 1. A superset of rules 740 is maintained in the central server 120 and may be continually updated, with new rules added, existing rules modified, and some rules possibly deleted. The central server 120 sends each new rule to each DSM 140 and each DSM 140 processes the new rule for each subtending host 160. In the process of FIG. 27, the recommendation engine 1860 of a DSM 140 optionally handles one host at a time. When a host 160 is considered for security update, new rules added or rules that have been modified since an immediately preceding processing of the host are identified and included in a rule-set, labeled rule-set-1, to be processed regardless of the state of the host. Existing rules that were applied to the host in an immediately preceding examination of the host security configuration may be processed again in a current examination of the same host 160 according to changes in the host state.

The procedure of FIG. 27 is recursive. In step 2710, two rule sets, rule-set-1 mentioned above and rule-set-2 are initialized as empty sets. Upon completion of the procedure, rule-set-1 contains rules to be executed for the host 160 under consideration, and rule-set-2 becomes an empty set or contains rules that need not be applied in the current examination of the host.

In step 2720, the DSM 140 identifies rules that have been added or modified since the immediately preceding examination. The identified rules are added to rule-set-1. In step 2722, queries applicable to the host under consideration are identified and placed in a set termed "query-set". In step 2724, rules associated with the queries in rule-set-1 are examined to determine if both are empty. If the two sets are empty, the procedure is directed to step 2732 for action. Otherwise, the queries in query set are processed in step 2740. Each rule in rule-set-2 corresponding to a query of changing response is transferred from rule-set-2 to rule-set-1. The result of each query and an indicator of the query's response are recorded at the DSM 140 (step 2744). In step 2750, each rule in rule-set-1 is executed to determine whether the rule's processing is complete, i.e., whether a leaf in the rules domain has been reached. When a rule is processed to completion and a recommended action, if any, is taken or recorded for subsequent implementation, the rule is deleted from rule-set-1. If a rule's processing is not yet complete, steps 2730, 2740, 2742, 2744, and 2750 are repeated. When step 2730 indicates that rule-set-1 is empty, i.e., all the relevant rules to the host 160 under consideration have been executed, step 2732 is executed to perform the recommendations produced by executing the rules. The recommendations could be leaving the security configuration of a target host 160 unchanged or modifying the security configuration by adding new filters to the host and/or removing already installed filters from the host.

Figure 28:
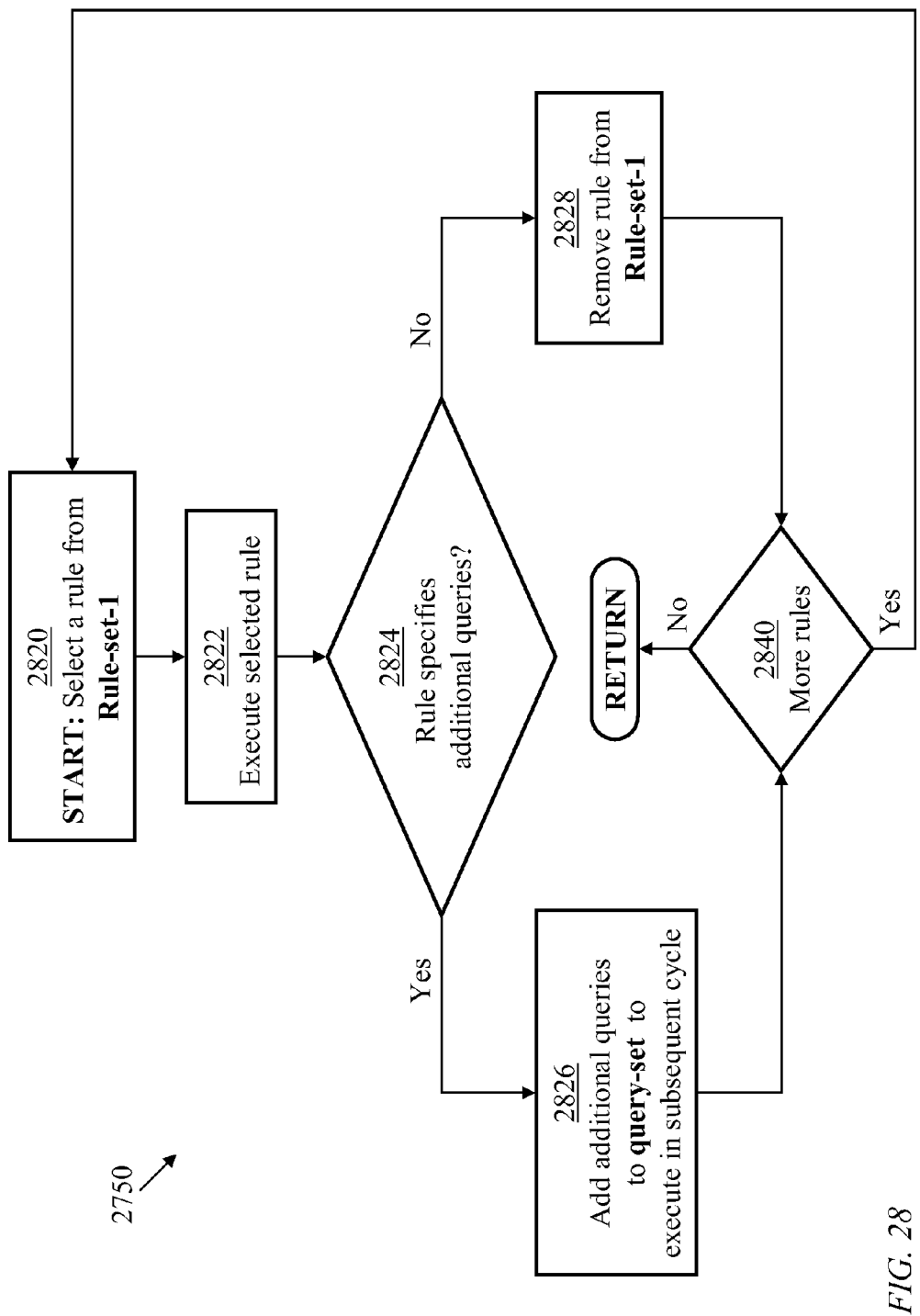
FIG. 28 details a step in the process of FIG. 27 for selecting host-state-dependent descriptors in a rule tree and eliminating unnecessary rules from the list of candidate rules.

FIG. 28 details step 2750 of processing selected rules. In step 2820, the recommendation engine 1860 selects a rule from rule-set-1 and continues to process the rule in step 2822. In step 2824, the recommendation engine determines whether the rule requires sending more queries to the host 160. If no further queries are required, the rule processing is considered complete and in step 2828 the recommendation engine 1860 removes the rule from rule-set-1 after recording any action resulting from executing the rule for subsequent implementation and step 2840 is executed. If the rule is encoded in the form of a rule tree, as described with reference to FIG. 9, step 2828 is reached when step 2824 determines that a leaf descriptor of the rule tree has been encountered. If step 2824 determines that a further descriptor (hence another query) is needed to acquire another data element 760 from the host, step 2826 is activated to identify the further descriptor and a corresponding query is added to the query-set for consideration in a subsequent cycle of the iterative process of FIG. 27, and step 2840 is executed. If step 2840 determines that all rules in rule-set-1 have been processed, processing with respect to the current host 160 is considered complete and another host 160 may be considered. Otherwise, step 2820 is revisited to select another rule from rule-set-1.

Setting Host-monitoring Period

The DSM stores a profile and corresponding metadata for each of its subtending hosts. Each host is monitored every "monitoring period" to determine a current host-protection configuration. A default monitoring period may be assigned to a host 160 and updated as the state of the host changes.

The recommendation engine 1860 associated with a DSM 140 (FIG. 18) processes intrusion-protection software for determining a current host-protection configuration for each host. The engine has means for:

communicating with the deep-security agent (in memory device 1932, FIG. 19) to acquire current metadata and determine a current host intrusion-protection configuration;

detecting discrepancy between the current host-protection configuration and a prior host-protection configuration;

transmitting updated host-protection configuration to the host where needed;

recording successive host-reconfiguration periods where a host reconfiguration period is a difference between successive instants of time at which a current host-protection configuration differs from a prior host-protection configuration;

updating the monitoring period according to a value of at least one of the successive host-reconfiguration periods; and scheduling subsequent activation of the intrusion-protection software according to the monitoring period.

The engine may determine an updated monitoring period associated with a host as an arithmetic mean value of a current host-reconfiguration period in the successive host-reconfiguration periods and a preceding monitoring period of said each host.

Alternatively, the engine may determine the monitoring period as an arithmetic mean value or a geometric mean value of a predetermined number of host-reconfiguration periods in the successive host-reconfiguration periods. The monitoring period determined as an arithmetic mean value may be further reduced by a standard deviation, or a standard deviation multiplied by a predefined value, of said predetermined number of host-reconfiguration periods subject to a condition that the monitoring period exceeds a predetermined lower bound.

Figure 29:
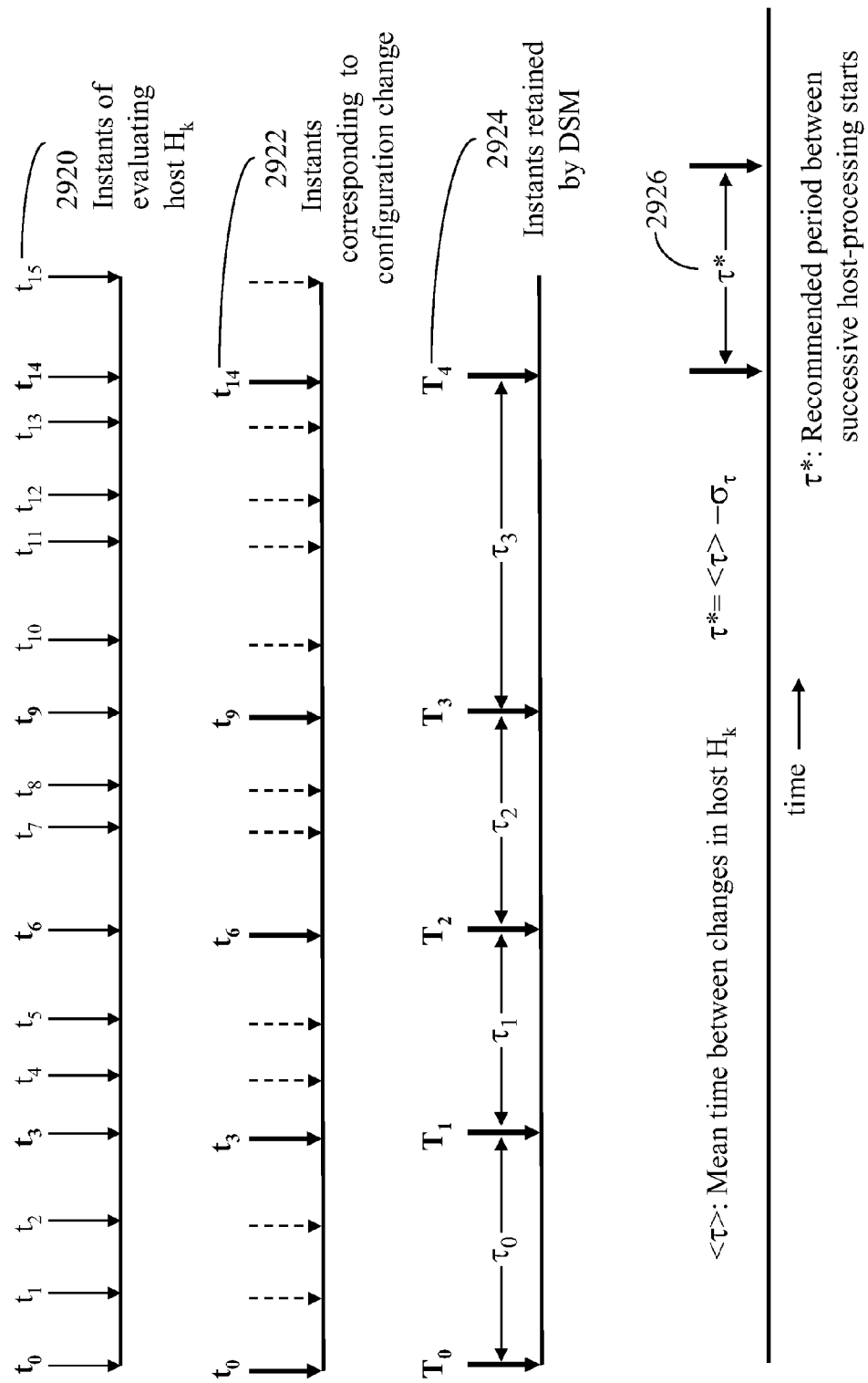
FIG. 29 illustrates a first scheme for host-specific reconfiguration-period tracking for updating host monitoring period, in accordance with an embodiment of the present invention.

FIG. 29 illustrates a first scheme of host-specific reconfiguration-period tracking for updating host monitoring period. A DSM 140 starts examining a specific host 160 at instants of time 2920, denoted $t_j$, $j \geq 0$. The result of each examination is either a modification of the security configuration of the specific host or confirmation that a current security configuration is adequate. The instants of time 2920 of interest, identified by bold arrows in FIG. 29 and referenced as 2922, are those instants corresponding to host examinations that result in security-configuration change. These instants, labeled $t_0$, $t_3$, $t_6$, and $t_{14}$, in the example of FIG. 29, are illustrated separately and labeled sequentially as $T_0$, $T_1$, $T_2$, $T_3$ and $T_4$ (referenced as 2924). The DSM 140 may retain records of the intervals $\tau_j = (T_{j+1} - T_j)$, $j \geq 0$, between successive configuration-change instants $T_j$ and $T_{j+1}$, to be used to time (schedule) subsequent host examinations. In accordance with an embodiment of the present invention, the mean value $<\tau>$ and standard deviation $\sigma_{96}$ of the interval $\tau$ (determined from the samples $\tau_j$, $j \geq 0$) between successive security-configuration changes may be used to determine a schedule for examining the specific host with the objective of minimizing computational effort at the DSM 140 and reducing the rate of query transmission to the host. An interval $\tau^*$ (reference 2926) between successive examinations may be set to equal ($<\tau> - \sigma_\tau$), where the mean value $<\tau>$ and standard deviation $\sigma_\tau$, of the interval between successive security-configuration changes are determined from the values $\tau_j$, $j \geq 0$ retained by the DSM. The interval $\tau^*$ may also be determined as a geometric mean of intervals between successive security-configuration changes. The interval $\tau^*$ may be used as a monitoring period for a respective host 160.

Figure 30:
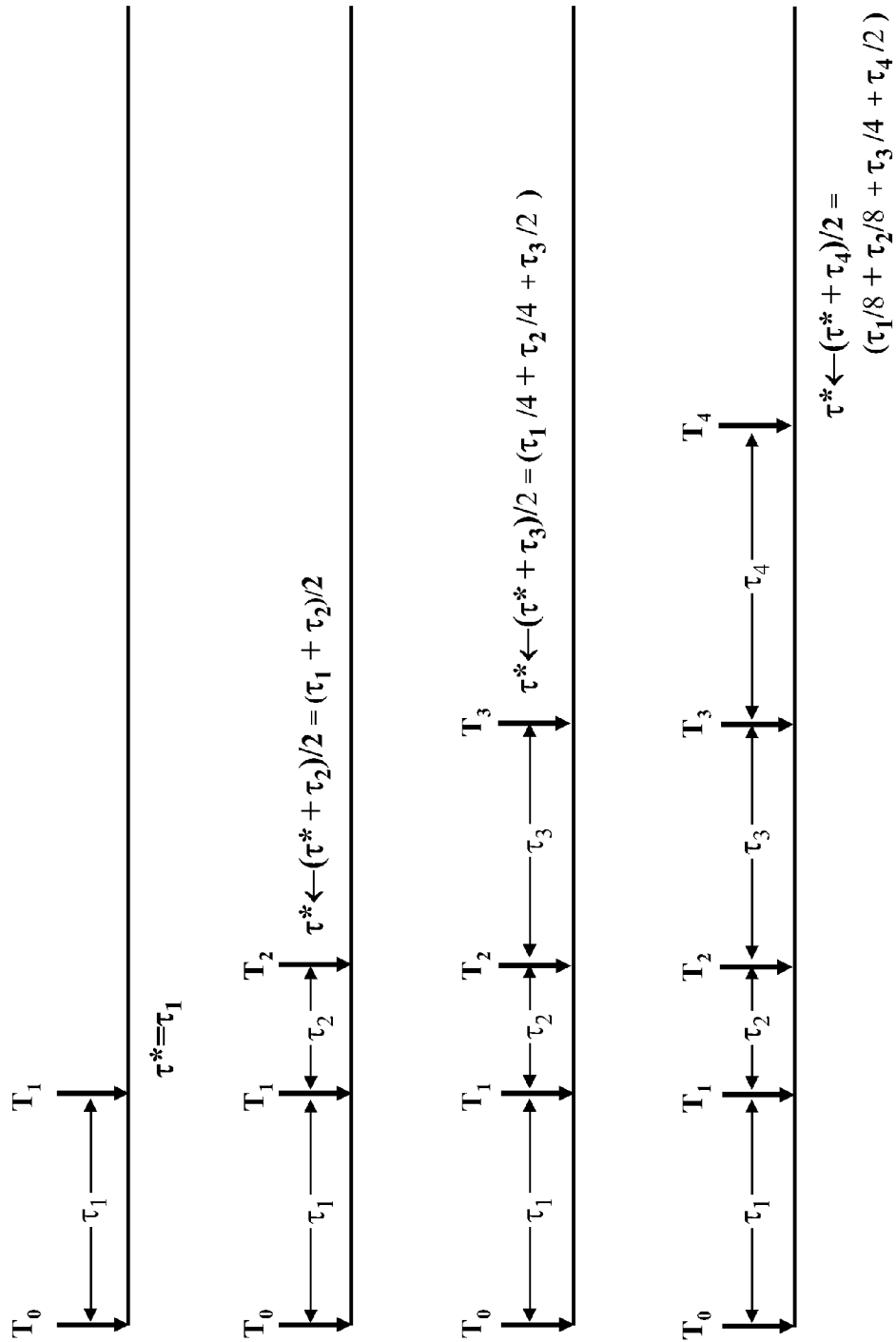
FIG. 30 illustrates a second scheme for host-specific reconfiguration-period tracking for updating host monitoring period, in accordance with an embodiment of the present invention.

FIG. 30 illustrates a second scheme of host-specific reconfiguration-period tracking for updating host monitoring period. In the scheme of FIG. 29, instants of host reconfiguration $T_0$, $T_1$, $T_2$, $T_3$, and $T_4$ are determined and used to determine corresponding host-reconfiguration periods $\tau_1$, $\tau_1$, $\rho_2$, and $\tau_3$. In the scheme of FIG. 30, the host monitoring period $\tau_j$ following the $j^{th}$ reconfiguration instant $T_j$ is determined as $\tau^* \leftarrow (\tau_j + \tau^*)/2$, for $j>0$, with $\tau^* = \tau_0$ for $j=0$. Thus, after the second reconfiguration instant T2, the monitoring period equals $(\tau_1 + \tau_2)/2$, after the third reconfiguration instant, the monitoring period equals $(\tau_1/4 + \tau_2/4 + \tau_2/2)$, after the fourth reconfiguration instant, the monitoring period equals $(\tau_1/8 + \tau_2/8 + \tau_3/4 + \tau_3/2)$, and so on. Thus, more emphasis is placed on the most recent values of the reconfiguration periods. The scheme of FIG. 30 is significantly simpler than the scheme of FIG. 29.

Figure 31:
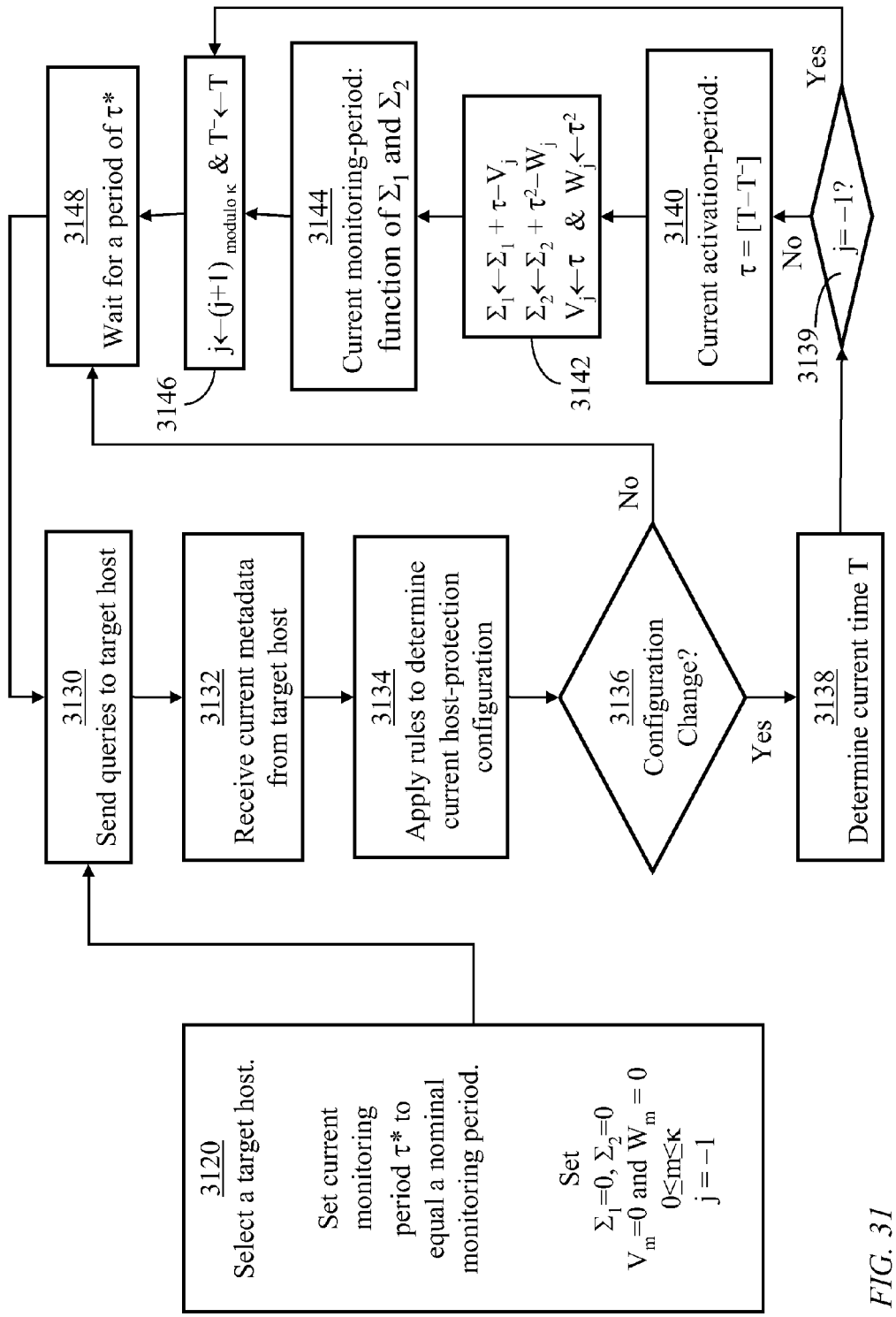
FIG. 31 illustrates a first method of host monitoring period update in accordance with an embodiment of the present invention.

FIG. 31 is a flow chart summarizing a first method implemented at a DSM 140 for individually updating host monitoring periods of a set of hosts supported by the DSM and, consequently regulating communications between the server and the hosts 160. The method is based on the reconfiguration-tracking scheme of FIG. 29. In step 3120, The DSM selects a target host 160 from among the plurality of hosts 160. Initially, each host 160 is assigned a nominal monitoring period $\tau^*$ which may be continuously updated according to the state of the host. The method uses a number $\kappa > 1$ of consecutive host reconfiguration periods to determine a mean value and a standard deviation of a monitored host. A preferred value of $\kappa$ is of the order of 8. A first sum $\Sigma_1$, for determining a first moment (mean value) of host reconfiguration periods, is initialized to zero. Likewise, a second sum $\Sigma_2$, for determining a second moment of host reconfiguration periods, is initialized to zero. A first vector $V_m$, $0 \leq V_{m<\kappa}$, having $\kappa$ entries for storing most-recent $\kappa$ values of reconfiguration periods of a monitored host, is initialized to zero. A second vector $W_m$, $0 \leq W_{m<\kappa}$, having K entries for storing square values of the most-recent $\kappa$ values of reconfiguration periods, is initialized to zero. The first vector suffices for the needed computation. However, using the second vector reduces the computation effort. A cyclic event counter j is also initialized to –1.

A process for determining a current host-protection configuration for the monitored host comprises steps 3130, 3132, and 3134. In step 3130, the DSM 140 sends queries to the monitored host 160 to acquire respective data elements. Each query corresponds to a descriptor. In step 3132, the DSM receives data elements from the monitored host 160 and in step 3134 the DSM applies a set of rules applicable to the monitored host to determine a current host-protection configuration. The steps 3130, 3132, and 3134 may be interleaved.

As described earlier, a DSM stores a profile for each of its subtending hosts 160. In step 3136, the DSM compares the current host-protection configuration derived in step 3134 with a previous host-protection configuration. If the current and previous host-protection configurations are equivalent, the monitoring period is unchanged and the DSM schedules a subsequent monitoring session of the same host based on the same monitoring period. If step 3136 determines that the current and previous host-protection configurations are different, the DSM starts a process of reconfiguring the monitored host and records a reconfiguration instant of time T (step 3138), which is a current time indicator. For the first reconfiguration event with respect to the monitored host, as determined in step 3139, the DSM does not have data to determine a host reconfiguration period. Thus, step 3146 is executed to increase the event counter j to zero and record the value of T as a prior reconfiguration instant $T^-$. The monitoring period is still unchanged and is used in step 3148 to schedule a subsequent monitoring session for the same host. In the subsequent session, steps 3130, 3132, and 3134 are executed and when step 3136 determines a subsequent reconfiguration event, the DSM starts a reconfiguration process of the monitored host and records a current reconfiguration instant T. A current reconfiguration period $\tau$ is determined in step 3140 as a difference between T and $T^-$. The values of $\Sigma_1$, $\Sigma_2$, entry $V_j$, and $W_j$ are updated in step 3142 as:

$$\Sigma_1 \leftarrow \Sigma_1+(\tau-V_j); \Sigma_2 \leftarrow \Sigma_2+(\tau^2-W_j); V_j \leftarrow \tau; \text{ and } W_j \leftarrow \tau^2.$$

It is noted that in actual implementation, $\tau^2$ is computed once for use in updating $W_j$ and $\Sigma_2$.

With continuous operation of the intrusion-protection system, the number of reconfiguration events may grow. However, reconfiguration periods are retained for only $\kappa$ most-recent reconfigurations. The event counter j is a circular counter increased by one, modulo $\kappa$, as indicated in step 3146, with each new reconfiguration event. A 25 number of $\kappa$ successive reconfiguration periods $\tau$ may be stored in circular indices of vector $V_j$, $0 \leq j < \kappa$, and similarly, successive values of $\tau^2$ are stored in circular indices of vector $W_j$, $0 \leq j < \kappa$. Initially, in a transient period before accumulating $\kappa$ reconfiguration periods, a smaller number $\lambda \leq \kappa$ of reconfigurations periods may be used for updating the host monitoring period. In step 3144, the host monitoring period $\tau^*$ may be updated to equal the mean value $<\tau>=\Sigma_1/\lambda$, or the mean value $<\tau>$ minus a multiplier $\alpha$ of the standard deviation $\sigma$ of the reconfiguration periods; preferably, $0 < \alpha < 2$. The standard deviation $\sigma$ is determined in a conventional manner as $\sigma=(\Sigma_2/\lambda-<\tau>)^{1/2}$.

The host monitoring period $\tau^*$ is constrained to be at least equal to lower bound $\tau_a^*$ and to not exceed an upper bound $\tau_b^*$, i.e., $\tau_a^* \leq \tau^* \leq \tau_b^*$. The lower bound and the upper bound may be host specific.

The hosts 160 may have significantly different host monitoring periods. A DSM 140 schedules the monitoring processes of its subtending hosts 160 so that each host is monitored at least once during a predefined global monitoring period.

Figure 32:
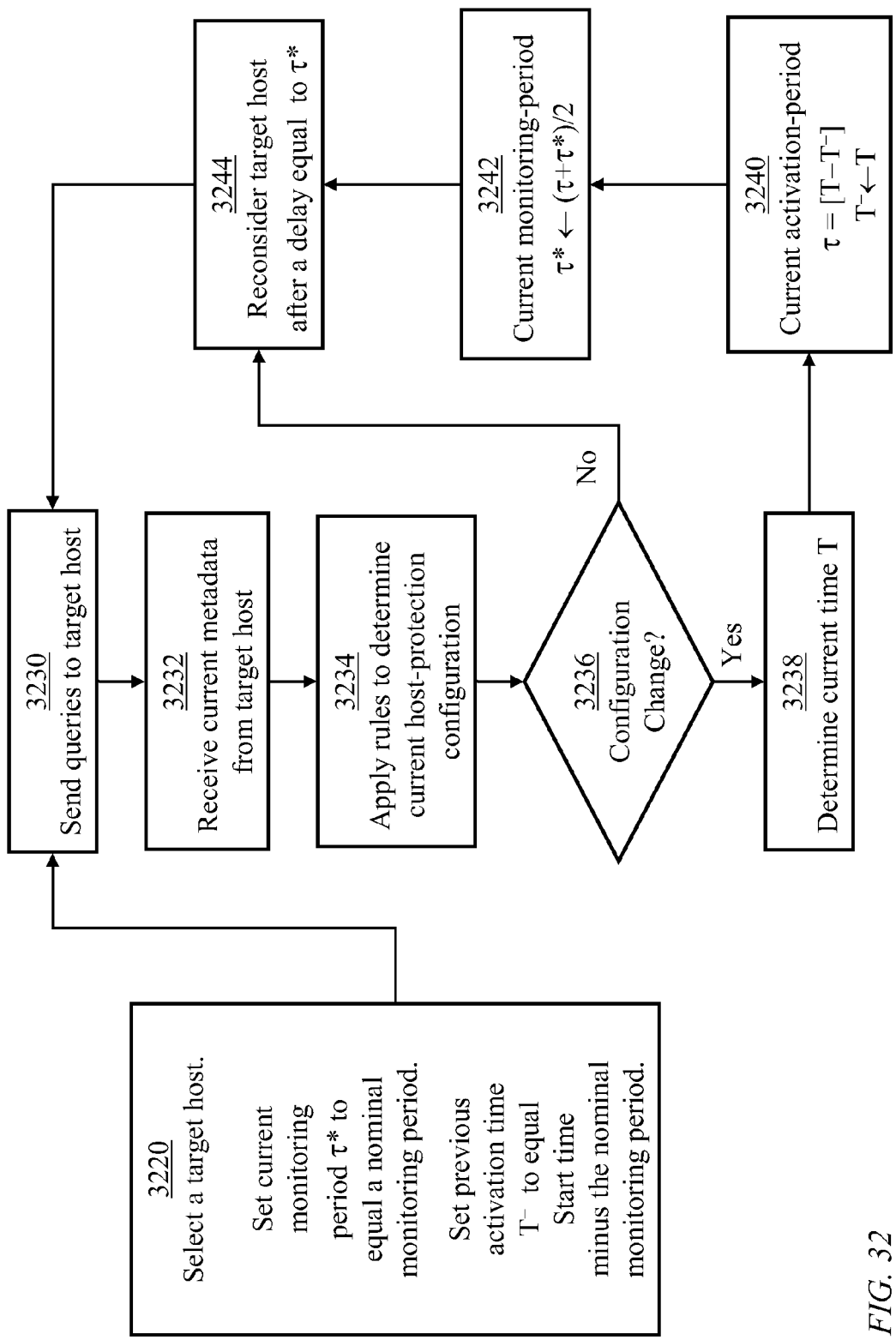
FIG. 32 illustrates a second method of host monitoring period update in accordance with an embodiment of the present invention.

FIG. 32 is a flow chart summarizing a second method implemented at a DSM 140 for individually updating host monitoring periods of a set of hosts supported by the DSM and, consequently regulating communications between said server and the hosts 160. The method is based on the reconfiguration-tracking scheme of FIG. 30. In step 3220, the DSM selects a target host 160 from among the plurality of hosts 160. Initially, each host 160 is assigned a nominal monitoring period $\tau^*$ which may be continuously updated according to the state of the host. A variable $T^-$ representing a previous reconfiguration instant is set to equal a current (start) time minus a nominal monitoring period $\tau^*$ of the target host. Steps 3230, 3232, and 3234 are similar to steps 3130, 3132, and 3134 of FIG. 31 and implement a process of determining current host-protection configuration for the target host.

A DSM 140 stores a profile for each of its subtending hosts 160. In Step 3236, the DSM compares the current host-protection configuration derived in step 3234 with a previous host-protection configuration. If the current and previous host-protection configurations are equivalent, the monitoring period is unchanged and the DSM schedules a subsequent monitoring session of the same host based on the same monitoring period (step 3244). If step 3236 determines that the current and previous host-protection configurations are different, the DSM starts a process of reconfiguring the monitored host and records a reconfiguration instant of time T (step 3238), which is a current time indicator. In step 3240, the DSM determines a current reconfiguration period $\tau$ as a difference $(T-T^-)$, and the value $T^-$ of a previous-reconfiguration instant is updated to equal T. In step 3242, a new value of the host monitoring period is determined as $\tau^* \leftarrow (\tau^*+\tau)/2$. In step 3244, the DSM 140 schedules a subsequent monitoring session for the same target host according to the new value of $\tau^*$.

It is noted that a time indicator is likely to be cyclic, for example expressed as a number between 0 and $(2^{32}-1)$, and the cyclic nature should be taken into account in computing a reconfiguration period $\tau$ by determining the difference $(T-T^-)$ as $[T-T^-]=\{T-T^-\}_{modulo\ Y}$, Y being the time-indicator period; for example $Y=2^{32}$. For example, successive reconfiguration instants of 4,294,967,290 and 0,000,000,020 time units yield a reconfiguration period of (0,000,000,020-4,294,967,290+232)=26 time units.

In a transient period after a first reconfiguration event, step 3242 may determine the current monitoring period $\tau^*$ to equal the predefined nominal value of $\tau^*$, as illustrated in FIG. 30, or as $(\tau^*+\tau)/2$. The monitoring period $\tau^*$ may be constrained by an upper bound $\tau_b^*$ specific to the target host. Using such a constraint is useful to ensure an adequate monitoring rate for a host after an unusually large reconfiguration period.

The DSM monitors each of its subtending hosts at least once during a cyclic global 20 monitoring period.

EXAMPLES

When the recommendation engine is run to examine a specific host 160, it first gathers a subset of rules that should be run. Once the subset of rules that should be run is established based on data and timestamp requirements, the engine processes a first set of queries against the agent residing in a host. A first set of queries is derived based on previous runs of the subset of rules and their monitor period with respect to the specific host. Query processing is minimized by processing a query only once regardless of the number of rules associated with the query.

Once the first set of queries has been run, the expressions associated with the set of rules are then evaluated. Once all expressions have been processed, the engine decides what to do next:

if a rule's execution did not produce any additional queries to execute, the rule's processing is considered complete;
if a rule produced queries to execute that have already been processed, the rule's processing is considered complete; and
if a rule produced new queries to execute, the rule requires further processing, and the new queries are added the list of queries to execute.

The rule execution ends when none of the rules produces additional new queries to execute. Once the execution is complete, the rule's actions are performed. The following outlines steps of an exemplary detection rule run instance against a given host.

1. The DSM 140 has four different rules:
   Rule 1 determines if service A exists;
   Rule 2 determines if service B exists and if registry keys C and D exist;
   Rule 3 determines if a given process is running; and
   Rule 4 is a platform-specific rule that relies on a specific file existing in the host.
2. The detection engine (recommendation engine) processing begins.
3. The engine checks if any rules have been modified since the engine was last run. It determines that Rule 3 is a new rule that was never run and flags it to be run in the "must execute" set (rule-set-1).
4. The engine then checks a list of monitored host queries. It finds two queries that were previously recorded to be monitored: getservices( ) and getRegistryValue(C)
5. Based on the two queries above, the engine determines that Rule 1 and Rule 2 need be run. They are added to a "conditionally execute" set (rule-set-2). The engine finds that when Rule 4 was previously run it was considered inapplicable. Hence, Rule 4 need not be executed again in the current run.
6. Query execution begins. The two queries above are executed on the Agent.
7. The response of the host indicates that the current results of getServices( ) are identical to an immediately preceding result but the current results of the getRegistryValue (C) are different from those obtained in the preceding run.
8. Rule-set-2 is executed. Rule 1 is noted as only being dependant on getServices( ). Since the results of the query have not changed, Rule 1 is not added to the "must execute" Rule-set-1. Rule 2 is noted as being dependant on both getServices( ) and getRegistryValue(C). Because the results of the latter have changed since the last execution, Rule 2 is added to the "must execute" rule-set-1.
9. Monitoring data for the two queries executed is updated to note the new results and update times of the queries.
10. The rules in the "must execute" rule-set-1 are now executed in an arbitrary order. Rule 3 is processed. It is run, and it determines that "getRunningProcesses( )" should be run to have a complete data set. Rule 2 is processed. It is run and uses the results of getServices( ) and getRegistryValue(C). Based on the new result of the latter, a condition not previously executed in its script is executed, and then goes to request getRegistryValue(D) which is not yet available, but is noted.
11. Neither rule had a complete set of data elements, so both are left in the "must execute" set.
12. The two new queries getRunningProcess( ) and getRegistryValue(D) are now processed and the results are stored at the DSM.
13. Both new queries are noted in the database (DB) as requiring monitoring to ensure changes to their values will result in re-execution of the rules.
14. The rules are executed again:
    Rule 3 now has all the data it needs, the rule is executed but does not recommend any changes in the host security configuration.
    Rule 2 now has all required data. The rule is executed and determines that a given condition for an action is satisfied. The engine queues an identifier of the action.
15. Neither of the two rules, Rule 3 and Rule 2, rule has additional queries to execute, and both are removed from the "must execute" rule-set-1.
16.
17. The one queued action is performed for Rule 2.
18. Additional metadata may be processed to track obsolete rules and queries.
19. Examination of the specific host is now complete.

Removing Installed Filters

The detection rules 740 and expressions 1620 are defined at the central server 120. They contain script and directives that are processed by the recommendation engine 1860. In order for the recommendation engine to remove unnecessary Filters, it processes all detection rules including those that are associated with Filters that are already applied to an Agents security configuration.

A first pass assesses the included detection expressions complexity and determines a first set of agent queries to execute. The recommendation engine then communicates with the agent and executes the queries. The query results are processed, and another run through the detection rules is performed if necessary. This process continues until the recommendation engine determines that it can gather no more useful information from the Agent in order to process the detection rules.

The expressions have access to any data or software tool in the DSM. The functions of the expressions include:
performing queries on an agent (1932, FIG. 19);
accessing a current configuration of a host 160;
determining if an installed filter 620 in a host 160 has been activated;
determining results of an activated filter;
verifying a state of a firewall port on which a specific filter operates; and
comparing behaviors of different hosts 160 having a given filter.

The recommendation engine 1860 checks the results of executing the detection rules, using the gathered information from the queries. A detection rule may relate to filter removal and the DSM may either display a recommendation that a specific filter be removed or automatically remove the Filter from the Agent's security configuration.

In the former case, the DSM administrator manually removes the filter, and instructs the DSM to apply a security configuration update. In the latter case, the DSM immediately applies a new security configuration to the agent of a host 160 under consideration with the specific filter excluded.

The steps leading to filter removal from a host 160 are illustrated by means of the simple example below.

1) A filter is defined and installed in the central server 120. For example, the purpose of the filter may be to prevent a particular exploit against a software entity, e.g., IIS 5.0 (Internet Information Server 5.0).
2) A detection rule and a set of detection expressions are attached to the filter. The Expressions have script/code within them to check registry values on running services on the host to test the IIS version. The rule calls the expression, and determines that the filter is redundant if the IIS version is greater than or equal to 6.0. All of this logic/data is static.
3) A DSM receives the newest update from the central server 120, the update containing the new filter and associated rule and expressions.
4) An administrator of the DSM opts to enable the filter on a given web server supported by the DSM. This web server is configured to make ongoing recommendations about what application types and filters to assign and remove.
5) The recommendation engine 1860 of the DSM processes the new rule and expressions.
6) The expressions ask for the set of services running on the host. The agent is queried, and a list of all services on the host is returned.
7) The expressions are run again using the list of services. It determines that IIS is installed as a service. The expressions query the registry in a few key places for data that can be used to determine the IIS version. The agent registry queries are deduced, and made to the agent
8) In a final run, the expressions are evaluated again with all the previous set of host metadata. The Expression concludes that IIS version 6.0 installed. Based on this result, the rule creates a record indicating that the filter is redundant and should be flagged for removal.
9) An Alert is created to notify the administrator of the result. The administrator removes the filter manually.

Another example of filter removal is given below with a specific rule already available on the DSM. The filter prevents buffer overflow from occurring in a Hypertext Preprocessor (PHP) module designed to plug-in to IIS.

1) An admin activates DSM and requests a recommendation scan of a given host.
2) The engine determines that it has never run the specific rule, and runs it.
3) A first pass of the rule indicates that several agent queries are necessary to determine whether IIS is installed and active using service and file information and to determine whether the Hypertext Preprocessor plug-in is installed by checking file signatures and configuration data
4) The queries are executed.
5) The rule runs again with the information learned from the host. The rule determines that IIS is installed and active, but the Hypertext Preprocessor plug-in is not available. It then checks on the host to see if the filter has been triggered in the past, e.g., in the preceding two weeks, based on historical data. It determines that not enough information is available, and makes no recommendations.
6) The rule is continually monitored until 2 weeks later it is run again.
7) The same sequence of events occurs, but this time the rules two weeks time period has expired and no events have been raised for the specific rule. It concludes that the filter is redundant for the given host and may be removed.
8) An Alert is created to notify the administrator of the result. The administrator removes the filter manually.

Thus, by using a combination of statically provided logic, host configuration and events, and derived host queries, a method for dynamically assigning filters to a host's security configuration is provided.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. An intrusion-protection system comprising:
   a plurality of agents, each agent installed in a respective computer of a plurality of computers, said each agent comprising respective deep-packet-inspection modules, stored in a memory of said respective computer, for monitoring computer activities and identifying intrusions;
   a plurality of local servers, each local server comprising:
      at least one processor;
      at least one memory device storing detection software; and
      an interface communicatively coupled to each computer in a respective subset of said plurality of computers; and
   a central server maintaining a software library comprising deep-packet-inspection modules stored in a non-transitory computer-readable medium, said central server communicating said library to said each local server;
   said detection software causes said at least one processor to:
      recursively acquire a set of data elements from an agent installed in said each computer, said set of data elements characterizing a current configuration and running processes of said each computer, where a data element acquired from processing a query sent from said each local server to said each computer-indicates one of:
         a requirement for a requisite subsequent data element for characterization of said each computer; and
         completion of acquisition of all data elements;
      identify requisite deep-packet-inspection modules of said library compatible with said set of data elements;
      determine presence of each said requisite deep-packet-inspection module in said each computer; and
      responsive to an indication that at least one deep-packet-inspection module of said requisite deep-packet-inspection modules is not present in said each computer, install said at least one deep-packet-inspection module in said each computer.

2. The system of claim 1 wherein each data element of said set of data elements corresponds to a descriptor from a predefined superset of computer descriptors.

3. The system of claim 2 wherein said software library further comprises a set of a queries, each query corresponding to a specific data element of a plurality of data elements.

4. The system of claim 3 wherein said software library further comprises a set of expressions for determining requisite security configurations for each of said plurality of computers.

5. The system of claim 4 wherein said expressions are encoded in a script language.

6. The system of claim 1 wherein said detection software further causes said at least one processor to:
- determine presence of redundant deep-packet-inspection modules in said each computer, said redundant deep-packet-inspection modules being exclusive of said requisite deep-packet-inspection modules; and
- remove any redundant deep-packet-inspection module found in said each computer.

7. The system of claim 3 wherein said each local server maintains a database storing for each computer and for every query processed:
- a record of said every query;
- a record of a response acquired;
- an indication of a last execution time; and
- an indication of a recommended succeeding execution time.

8. The system of claim 7 wherein said each local server maintains historical data related to changes in queries responses.

9. The system of claim 1 wherein said DPI modules of said library comprise encoded intrusion-protection filters individually matching corresponding intrusion patterns.

10. The system of claim 9 wherein said each computer receives data packets from external sources through a network and wherein at least one of said encoded intrusion-protection filters causes said each computer to examine content of said data packets to detect intrusion patterns.

11. At a server having at least one processor, a method of intrusion prevention comprising:
- specifying data elements for characterizing a plurality of computers communicatively coupled to said server, each data element corresponding to a descriptor from a predefined superset of descriptors;
- acquiring, from a central server, a software library comprising DPI modules for protecting said plurality of computers, said DPI modules comprising deep-packet-inspection instructions;
- storing, in a memory device of said server, detection software which causes a processor of said server to perform processes of:
  - recursive acquisition of a succession of data elements from an agent installed in a target computer of said plurality of computers where a data element acquired from processing a query sent from said each local server to said target computer indicates one of:
    - a requirement for a requisite subsequent data element for characterization of said target computer; and
    - completion of acquisition of all data elements;
  - identifying requisite DPI modules of said library compatible with said succession of data elements;
  - determining presence of each said DPI module in said target computer; and
  - responsive to an indication that at least one DPI module of said requisite DPI modules is not present in said target computer, installing said at least one DPI module in said target computer.

12. The method of claim 11 further comprising:
- storing, in said memory device, said data elements as current data elements and said requisite DPI modules as current DPI modules;
- repeating said prompting;
- receiving updated data elements from said target computer; and
- responsive to a determination of discrepancy between said updated data elements and said current data elements:
  - determining new requisite DPI modules of said library compatible with said updated data elements;
  - installing DPI modules of said new requisite DPI modules exclusive of said current DPI modules in said target computer;
  - determining presence of redundant DPI modules in said current DPI modules exclusive of said new requisite DPI modules; and
  - responsive to an indication of presence of at least one redundant DPI module, removing said at least one redundant DPI module from said target computer.

13. The method of claim 11 further comprising maintaining for the target computer:
- a record of time of receiving each data element of said data elements;
- content of said each data element; and
- identifiers of said requisite software modules.

14. The method of claim 13 wherein said prompting comprises sending queries to said target computer to acquire said data elements.

15. The method of claim 11 further comprising:
- receiving at said server an obligatory DPI module from the central server; and
- placing said obligatory DPI module in a list of obligatory DPI modules to be executed for each computer in said plurality of computers regardless of content of data elements provided by said each computer.

* * * * *

UNITED STATES PATENT AND TRADEMARK OFFICE
CERTIFICATE OF CORRECTION

PATENT NO. : 8,505,092 B2  Page 1 of 1
APPLICATION NO. : 11/874590
DATED : August 6, 2013
INVENTOR(S) : Durie et al.

It is certified that error appears in the above-identified patent and that said Letters Patent is hereby corrected as shown below:

In the Claims

Column 31, line 42, Claim 11, "DPI" should read --deep package inspection (DPI)--.
Column 32, line 8, Claim 11, delete the first instance of the word "said".

Signed and Sealed this
Fourteenth Day of October, 2014

Michelle K. Lee
*Deputy Director of the United States Patent and Trademark Office*